(12) United States Patent
Belinda et al.

(10) Patent No.: US 11,407,042 B2
(45) Date of Patent: Aug. 9, 2022

(54) COUNTERBORE TOOL AND SETTING TOOL FOR FASCIA SYSTEM AND INSTALLATION METHOD

(71) Applicant: OMG, Inc., Agawam, MA (US)

(72) Inventors: Richard L. Belinda, Westfield, MA (US); Peter Barenski, Jr., Stockbridge, MA (US)

(73) Assignee: OMG, Inc., Agawam, MA (US)

( * ) Notice: Subject to any disclaimer, the term of this patent is extended or adjusted under 35 U.S.C. 154(b) by 116 days.

(21) Appl. No.: 16/735,812

(22) Filed: Jan. 7, 2020

(65) Prior Publication Data

US 2020/0215624 A1 Jul. 9, 2020

Related U.S. Application Data

(60) Provisional application No. 62/789,116, filed on Jan. 7, 2019.

(51) Int. Cl.
*B23B 51/10* (2006.01)
*B23B 51/00* (2006.01)
*B23B 49/00* (2006.01)

(52) U.S. Cl.
CPC .......... *B23B 51/104* (2013.01); *B23B 49/005* (2013.01); *B23B 51/0081* (2013.01)

(58) Field of Classification Search
CPC ... B23B 51/104; B23B 51/10; B23B 51/0406; B23B 49/005; B23B 49/003; B23B 2260/112
See application file for complete search history.

(56) References Cited

U.S. PATENT DOCUMENTS 1,829,659 A * 10/1931 Kefflo ................. B23B 51/0406
408/204
2,897,695 A 8/1959 Winslow
(Continued)

FOREIGN PATENT DOCUMENTS

CN 203265708 U 11/2013
CN 204108427 U 1/2015
(Continued)

OTHER PUBLICATIONS

"3 Ways to Hide Screws," retrieved Oct. 4, 2017, www.woodmagazine.com.
(Continued)

*Primary Examiner* — Alan Snyder
(74) *Attorney, Agent, or Firm* — Alix, Yale & Ristas, LLP

(57) ABSTRACT

A drilling tool has a working piece retained by a retainer mounted to a collar. The working piece includes a distal shank and a cutting section and is rotationally fixed relative to the retainer. The retainer may include an engagement protrusion positioned outward of the shank with the protrusion engaging an inner surface of the collar or the collar may include an engagement protrusion with the protrusion engaging an inner surface of the retainer to create a quasi-floating relationship between the retainer and collar. The cutting section may have a distal primary bore cutting sub-section and a proximal counterbore cutting sub-section. The collar includes a lower surface for abutment against a building member during drilling operation to halt axial movement of the tool.

24 Claims, 30 Drawing Sheets

(56) References Cited

U.S. PATENT DOCUMENTS

| | | | |
|---|---|---|---|
| 2,899,851 A * | 8/1959 | Grobecker | B23B 51/102 408/25 |
| 3,838,937 A | 10/1974 | Hawley | |
| 4,815,902 A | 3/1989 | Durfee, Jr. | |
| 5,470,180 A | 11/1995 | Jore | |
| 5,482,410 A | 1/1996 | Chambers | |
| 5,795,110 A | 8/1998 | Wirth, Jr. et al. | |
| 6,558,097 B2 | 5/2003 | Mallet et al. | |
| 6,645,082 B1 | 11/2003 | Lessard et al. | |
| 6,905,291 B2 | 6/2005 | Day et al. | |
| 7,090,447 B2 | 8/2006 | Jager et al. | |
| 7,097,398 B2 | 8/2006 | Hernandez, Jr. | |
| 7,147,409 B2 | 12/2006 | Wienhold | |
| 7,258,513 B2 | 8/2007 | Gertner | |
| 7,264,427 B1 | 9/2007 | Kunz-Mujica | |
| 7,614,832 B2 | 11/2009 | Nappier et al. | |
| 8,052,359 B2 | 11/2011 | Wirth, Jr. et al. | |
| 8,104,248 B2 | 1/2012 | Gillis et al. | |
| 8,202,032 B2 | 6/2012 | Gillis et al. | |
| 8,226,654 B2 | 7/2012 | Ranck et al. | |
| 8,430,618 B2 | 4/2013 | Baer et al. | |
| 8,585,332 B2 | 11/2013 | Luepke et al. | |
| 8,672,332 B2 | 3/2014 | Kauper | |
| 8,714,887 B2 | 5/2014 | Tipps et al. | |
| 8,905,264 B2 | 12/2014 | White et al. | |
| 9,007,598 B1 | 4/2015 | Clark et al. | |
| 9,597,785 B1 | 3/2017 | Gertner | |
| 9,693,891 B2 | 7/2017 | MacIntyre-Ellis et al. | |
| 9,932,733 B2 | 4/2018 | Desautels et al. | |
| 2004/0228705 A1 | 11/2004 | Baer et al. | |
| 2005/0084347 A1 | 4/2005 | Clark | |
| 2007/0071576 A1 | 3/2007 | Romano et al. | |
| 2008/0069654 A1 | 3/2008 | Chasse | |
| 2008/0307627 A1 | 12/2008 | Gertner | |
| 2009/0129881 A1 | 5/2009 | Kawade | |
| 2010/0172706 A1 | 7/2010 | Wirth, Jr. et al. | |
| 2015/0298218 A1 | 10/2015 | Lee | |

FOREIGN PATENT DOCUMENTS

| | | | |
|---|---|---|---|
| CN | 104439435 A | 3/2015 | |
| CN | 104475833 A | 4/2015 | |
| CN | 104827102 A | 8/2015 | |
| CN | 107671334 A | 2/2018 | |
| DE | 2601519 A1 | 7/1976 | |
| DE | 3610016 A1 | 10/1987 | |
| DE | 102009010123 A1 | 8/2010 | |
| GB | 742281 A * | 12/1955 | B23B 51/104 |
| GB | 1378869 | 12/1974 | |
| JP | 61100307 A | 5/1986 | |
| JP | 1158115 A | 3/1999 | |
| JP | 2001018107 A | 1/2001 | |
| JP | 2009166225 A | 7/2009 | |
| KR | 200335550 U | 12/2003 | |
| WO | 9604091 A1 | 2/1996 | |

OTHER PUBLICATIONS

"Amana Tool 20204 Carbide Tipped Adjustable 29/64-5/8 D x 15/32 Cut Depth x 1/8-9/32 Inch SHK Counterbore Bit," retrieved Jan. 24, 2019, www.toolstoday.com.
"DECKFAST® Fascia System. Composite and PVC Deck Fascia Fastening System," Starborn Industries, Inc., retrieved Mar. 1, 2018, www.starbornindustries.com.
"DECKFAST® Fascia System Fastening System for PVC and Composite Deck Fascia Boards," Starborn Industries, Inc., www.starbornindustries.com.
"Fascia-Fastening Solution," Simpson Strong-Tie, retrieved Jan. 28, 2019, www.strongtie.com.
"Plugs for hiding screws in wood," created Feb. 14, 2004, updated Jun. 4, 2013, www.joneakes.com.
Smart-Bit® Pre-drilling and Countersinking Tool, Starborn Industries, Inc., www.starbornindustries.com.
"Splitstop Accessory Drive and Dimpling Tool for Composite Screws," retrieved Mar. 1, 2018, www.splitstop.com.
"TimberTech TOPLoc Fascia Screw (100 LF)," Hackmann Lumber, retrieved Jan. 24, 2019, https://store.hackmannstl.com.
W.L. Fuller Inc., Catalog Twenty-Five.

* cited by examiner

COUNTERBORE TOOL AND SETTING TOOL FOR FASCIA SYSTEM AND INSTALLATION METHOD

CROSS-REFERENCE TO RELATED APPLICATION

This application claims priority to U.S. Provisional Application No. 62/789,116, filed on Jan. 7, 2019, the entire content of which is incorporated herein by reference.

BACKGROUND

This disclosure relates to counterbore tools for forming a bore and counterbore for installing fasteners. More particularly, this disclosure relates to tools employed to form a bore and a counterbore for a screw and a plug. One preferred use of the disclosed tool is in securing fascia. Another embodiment of the device is useful to form a bore and counterbore for a screw without use of a plug.

Systems for attaching one building member, such as a fascia board of composite material, to another building member, such as a support, have become commonplace for providing decorative trim to various structures, for example in decking. The Cortex™ system of OMG, Inc., of Agawam, Mass., involves securing the trim by initially forming a bore and counterbore for a fastener. In some versions, the counterbore extends a depth so that the head of the fastener is driven below the exterior surface of the fascia board. A plug is then inserted into the counterbore above the fastener head to provide a smooth finished surface wherein the fastener head is fully covered and an aesthetically pleasing finished appearance is provided in a highly efficient manner. In other versions, a counterbore is formed having a depth to accommodate the head of a fastener without additional clearance for a plug. In such a case, the top surface of the fastener head may be painted a color to approximately match that of the fascia member.

It is highly desirable to provide a low cost counterbore tool which may be employed to reliably drill the fastener bore and form the counterbore in a building member, such as fascia trim of composite material, in a precise and reliable manner that does not mar or damage the fascia trim surface. It is also highly desirable to set the fastener at a proper depth without marring or damaging the building member surface.

SUMMARY

A drilling tool may comprise a working piece with a distal shank defining a central axis and a cutting section with a proximal tip.

In one embodiment, the drilling tool may have collar with a substantially cylindrical outer wall coaxial to the central axis. The collar may have a bottom wall defining an inner surface and an outer surface. The collar may circumscribe the working piece with the outer wall concealing a portion of the working piece.

In one embodiment, the drilling tool may have a retainer extending from the working piece and may be rotationally fixed to the working piece. The retainer may define a bottom surface facing the inner surface of the collar bottom wall. The retainer may be received by the collar and positioned within the outer wall. The retainer may be rotationally independent relative to the collar.

In one embodiment, the drilling tool may have an engagement protrusion between the bottom surface of the retainer and inner surface of the bottom wall. The engagement protrusion may provide axial clearance between the bottom surface and inner surface.

In one embodiment, the engagement protrusion is integral to the retainer and extends from the bottom surface toward the inner surface of the collar.

In one embodiment, the working piece is formed from a single sheet of metal and the cutting section includes machined surfaces forming cutting edges.

In one embodiment, each of the cutting edges is machined at an angle of between approximately 15° and 35° relative to the sheet, more preferably at an angle of between approximately 20° and 30° relative to the sheet, and even more preferably at an angle of approximately 25° relative to the sheet.

In one embodiment, the cutting section comprises a distal bore cutting subsection and an enlarged counterbore cutting subsection proximal of the bore cutting subsection.

In one embodiment, the bottom wall defines an outer surface for abutment against a building member during use of the tool to halt axial movement of the tool.

In one embodiment, the bottom wall comprises a plurality of nubs with spacing between one another.

In one embodiment, the bottom wall comprises a plurality of nubs that are circumferentially spaced about a peripherally outer area of the bottom wall.

In one embodiment, the retainer comprises a substantially circular disc through which the working piece extends axially. The disc may be received within the cylindrical wall.

In one embodiment, the engagement protrusion comprises a continuous annular ring extending about the retainer bottom surface substantially coaxial to the central axis.

In one embodiment, the engagement protrusion comprises a segmented annular ring extending about the retainer substantially coaxial to the central axis.

In one embodiment, the engagement protrusion comprises one or more projections extending toward the inner surface of the collar.

In one embodiment, the engagement protrusion comprises a continuous annular ring extending about the collar inner surface substantially coaxial to the central axis.

In one embodiment, the engagement protrusion comprises a segmented annular ring extending about the collar inner surface substantially coaxial to the central axis.

In one embodiment, the engagement protrusion comprises one or more projections extending toward the retainer bottom surface.

In one embodiment, the tool includes a retainer extending from the working piece intermediate the shank and the tip.

In one embodiment, the retainer and working piece are rotationally fixed.

In one embodiment, the retainer comprises an engagement protrusion positioned outward of the shank.

In one embodiment, the tool comprises a collar mounted to the retainer having an inner surface.

In one embodiment, the working piece and retainer are rotatable relative to the collar.

In one embodiment, an engagement protrusion engages the inner surface of the collar.

In one embodiment, the engagement protrusion comprises a continuous annular ring extending about the retainer substantially coaxial to the central axis.

In one embodiment, the engagement protrusion comprises a segmented annular ring extending about the retainer substantially coaxial to the central axis.

In one embodiment, the engagement protrusion comprises one or more projections extending toward the inner surface of the collar.

In one embodiment, the engagement protrusion is a continuous annular ring with a substantially parabolic cross-section contour defining an apex that circumscribes the axis, wherein the apex engages the inner surface.

In one embodiment, the working piece has a cutting section that comprises a distal bore cutting subsection and a counterbore cutting subsection proximal to the bore cutting section.

In one embodiment, the working piece is formed from a single sheet of metal.

In one embodiment, the working piece is formed from a single sheet of metal and the shank is formed by bending the sheet to a substantially cylindrical or polygonal prismic shape.

In one embodiment, the working piece is formed from a single sheet of metal and the cutting section includes machined surfaces to form cutting edges. The cutting section may include a bore cutting subsection and a counterbore cutting subsection. The edges that define the bore cutting subsection may continuously transition to the edges that define the counterbore cutting subsection. The edges that define the bore cutting subsection may transition to the counterbore cutting subsection with a relief angle therebetween.

In one embodiment, the working piece, collar and retainer are not all formed from the same material.

In one embodiment, the collar and retainer are each formed from a polymeric material and the working piece is formed from metal.

In one embodiment, the collar and retainer are formed from a thermoplastic material.

In one embodiment, the working piece is formed from steel.

In one embodiment, one or both of the collar and retainer are formed of an acetal, polyacetal, polyformaldehyde or polyoxymethylen (POM), and more preferably from Delrin® branded acetal homopolymer.

In one embodiment, the tool includes a retainer mounted relative to the working piece in a rotationally fixed relationship and defining a bottom surface facing the inner surface of a collar bottom wall. The retainer may be received by the collar positioned in a rotationally independent relationship.

In one embodiment, an engagement protrusion extends from the retainer or extends from the collar.

In one embodiment, an engagement protrusion forms a contact interface between the retainer and collar.

In one embodiment, an engagement protrusion maintains the retainer and collar in a quasi-floating configuration whereby the working piece and retainer are rotatable relative to the collar with the outer surface of the bottom wall forming an axial stop against a building member.

In one embodiment, an engagement protrusion extends from the retainer bottom surface toward the collar inner surface or extends from the collar inner surface toward the retainer bottom surface.

In one embodiment, the cutting section of the working piece has a blade-like form. The cutting section may have a bore cutting subsection having opposed convergent edges and a counterbore cutting subsection having opposed convergent edges an axial portion adjacent said bore cutting portion.

In one embodiment, the working piece has a pair of diametrically opposed shoulders and a pair of diametrically opposed tabs. The retainer may be captured between said shoulders and said tabs.

In one embodiment, the collar has an inner circumferential shelf and protrusions spaced from said shelf. The retainer may have a lip which is axially captured between the shelf and the protrusions.

In one embodiment, a driving tool comprises a bit with a shank portion and a coupler portion. The tool may have a collar mounted to the bit and defining a stop. The collar may be axially retained on said bit and rotatable relative to said bit.

In one embodiment, the collar defines a stepped central bore that engages a shoulder of said bit and a protuberance of the bit.

In one embodiment, the axial position of the collar on the bit effectively defines a setting depth of a fastener driven by the bit during operation.

In one embodiment, a method for installing a building member on a support member includes steps of providing a tool having a cutting portion and a stop, driving the tool into the building member and support member so that the cutting portion forms a bore and optionally a counterbore and said stop engages a face of the building member and is axially fixed while the tool continues to be rotatably driven, driving a fastener through said bore and optionally counterbore so that the head of the fastener is received by the counterbore. A portion of the counterbore, if present, may be disposed above said fastener head, and a plug may be inserted into said counterbore covering the fastener.

BRIEF DESCRIPTION OF THE DRAWINGS

A preferred embodiment of the invention is described herein with reference to the accompanying drawings in which like numerals represent like elements throughout.

DETAILED DESCRIPTION

Figure 1:
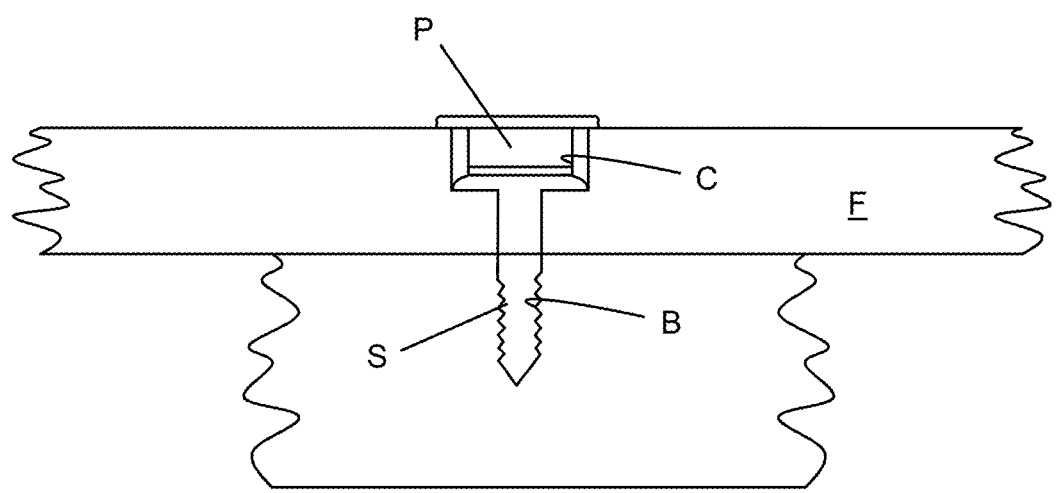
FIG. 1 is a sectional view through fascia illustrating a bore, a counterbore, a fastener and a decorative plug for implementing a fascia fastening system for which the counterbore tool and the setting tool of the present disclosure have application.
Figure 2:
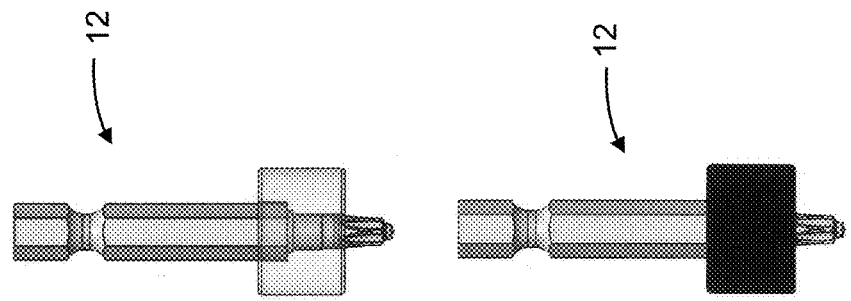
FIG. 2 is a schematic view showing components of a fascia fastening system.
Figure 2:
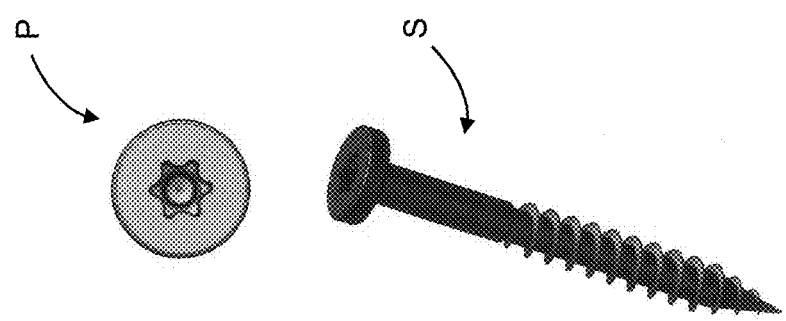
Figure 2:
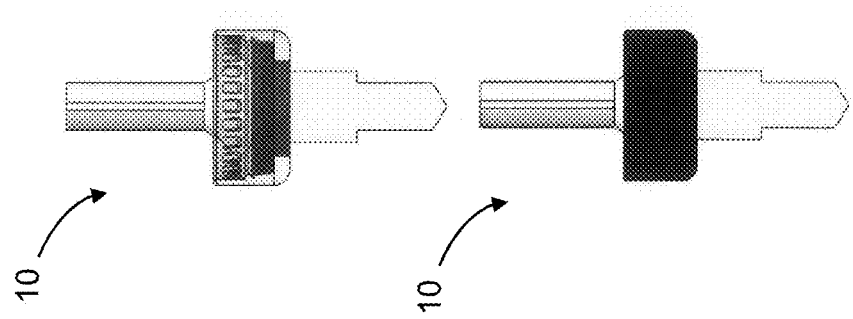

Among the benefits and improvements disclosed herein, other objects and advantages of the disclosed embodiments will become apparent from the following wherein like numerals represent like parts throughout the several figures. Detailed embodiments of a counterbore tool and setting tool are disclosed; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrase "in some embodiments" as used herein does not necessarily refer to the same embodiment(s), though it may. The phrases "in another embodiment" and "in some other embodiments" as used herein do not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on".

Further, the terms "substantial," "substantially," "similar," "similarly," "analogous," "analogously," "approximate," "approximately," and any combination thereof mean that differences between compared features or characteristics is less than 25% of the respective values/magnitudes in which the compared features or characteristics are measured and/or defined.

With reference to the drawings wherein like numerals represent like parts throughout the figures, a counterbore tool 10 is adapted to drill a fastener bore B and a counterbore C in a building member such as a fascia board F, for example. A setting tool 12 in the form of a bit is adapted to set a screw S at a proper depth into the building member. A decorative plug P may be inserted into the counterbore C above the head of the properly set screw S to form an aesthetically pleasing exterior surface of the fascia. In a later described embodiment, tool is configured to form a counterbore C with smaller depth sized to accommodate the head of the screw only. The counterbore tool 10 has a stop which engages the exterior surface of the fascia to provide a proper depth for the counterbore without marring the surface of the fascia board. The setting tool 12 also has a stop which engages the exterior surface of the fascia to drive the screw S to the proper depth without marring the surface of the fascia board F.

The counterbore tool 10 is assembled from three primary components, including a principal working component 20, a retainer 30 which is mounted to the component 20 in fixed rotatable relationship thereto and a collar 40 which is secured by the retainer 30 and is rotatable relative to the retainer 30 and the component 20.

Figure 8:
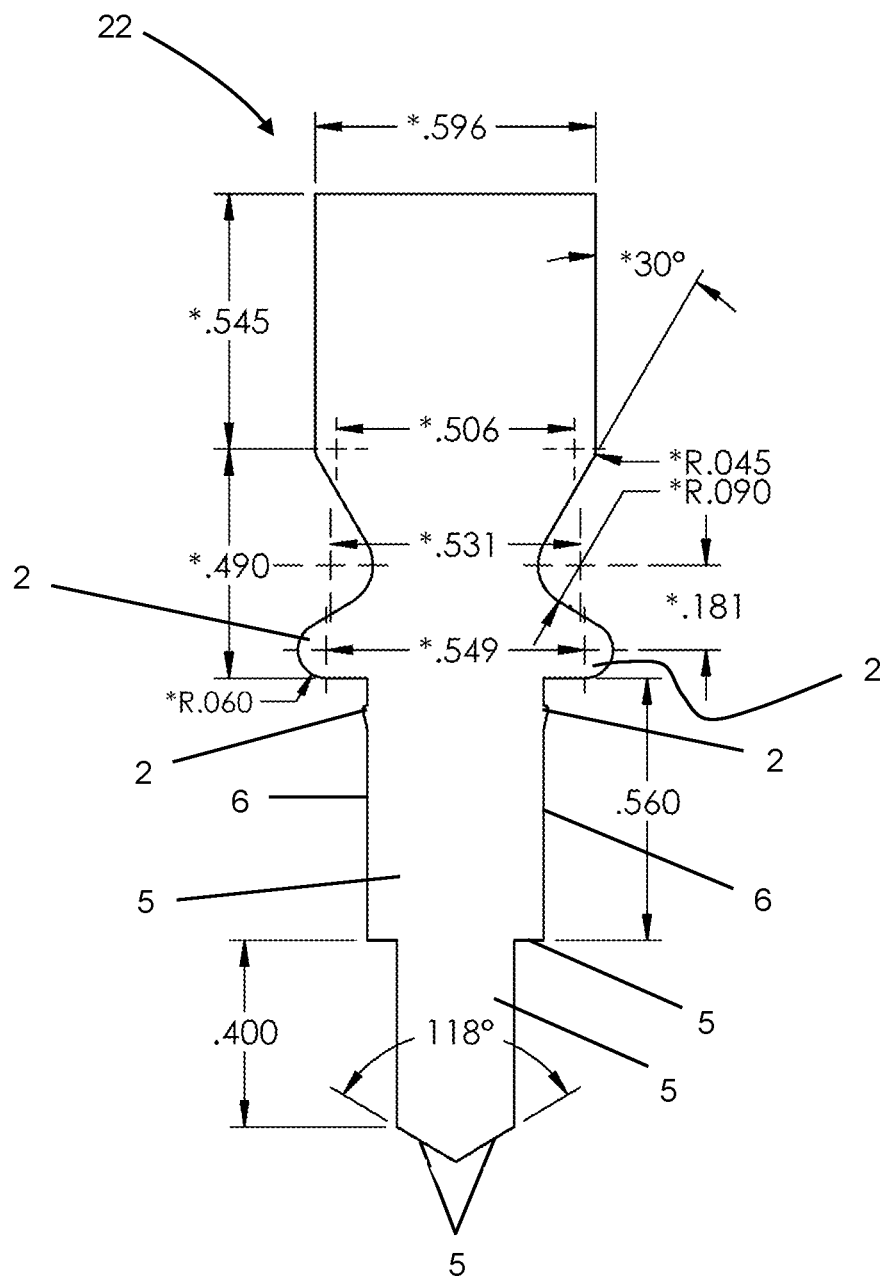
FIG. 8 is a plan view of a preform, partly in diagram, for the tool portion of FIG. 5A.
Figure 9:
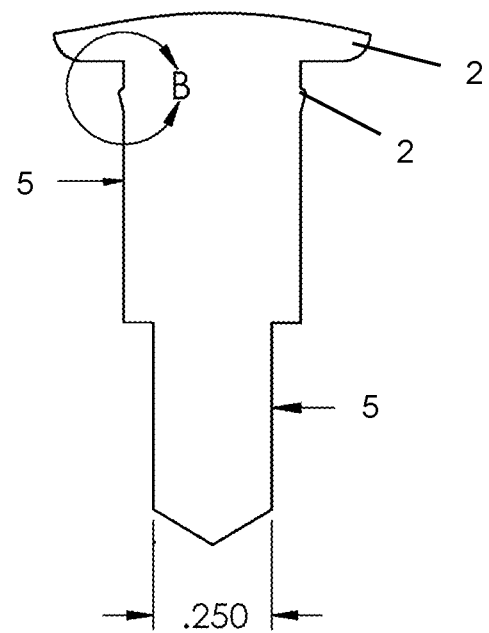
FIG. 9 is a fragmentary view, partly in diagram and partly annotated, for a portion of the preform of FIG. 8.

Component 20 is formed from a single flat sheet of metal 22 (FIG. 8) which is cut, formed and machined to form a proximal shank 24, a medial receiver portion 26 and a distal cutting element 28.

Figure 3A:
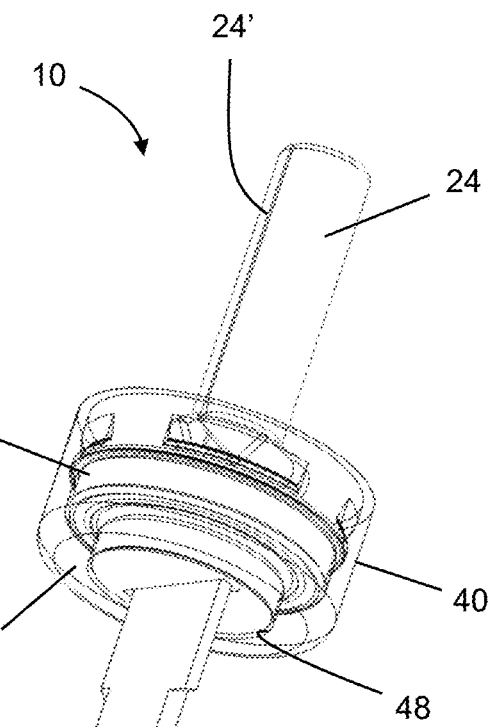
FIGS. 3A and 3B are perspective views of a counterbore tool of the present disclosure with a collar being illustrated as transparent to show detail.
Figure 3B:
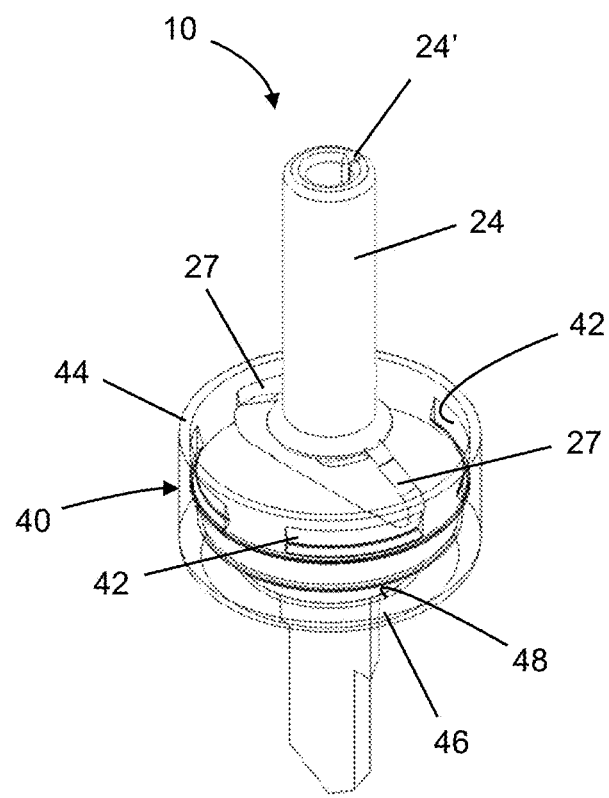

The shank 24 defines a central axis A and preferably has a generally cylindrical form with the opposite edge surfaces in close proximity or abutting one another along the cylinder circumference at an interface 24', shown in FIG. 3B. The shank 24 is adapted to be clamped into a chuck of a torque driver, typically a drill. In alternative embodiments (not illustrated), the shank may be formed into a three-sided configuration, a four-sided configuration, a hexagonal configuration or any polygonal configuration, each of which is preferably symmetric about a central axis through the shank. Notably, the working component 20 is configured such that the central axis A defined by the shank 24 runs through the tip 50.

The receiver 26 integrally extends from the shank and has a pair of diametrically opposed outwardly extending shoulders 27 which form engagement edges generally orthogonal to the central axis through the shank. A pair of integrally protruding tabs 29 project diametrically from the receiver and are equidistantly spaced in the axial direction below a respective shoulder.

The cutter 28 has a blade-like configuration which integrally extends from the receiver axially opposite the shank 24 and terminates in convergent or quasi-convergent configuration at tip 50. Oblique edges 52 extend from the tip and are ground on alternate sides to provide cutting lead edges 52.

Figure 21:
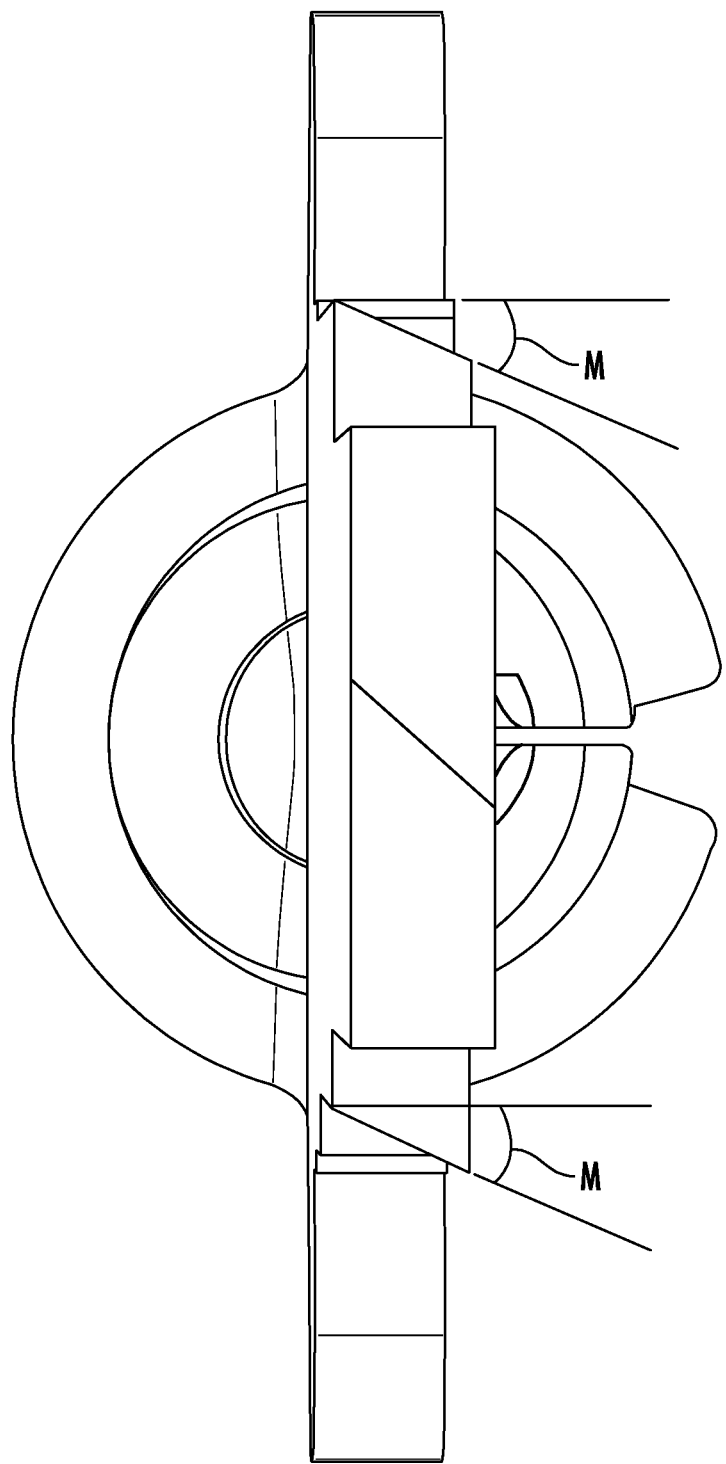
FIG. 21 is a bottom view of a working component of the disclosed tool with depth and shadowing for clarity.
Figure 22:
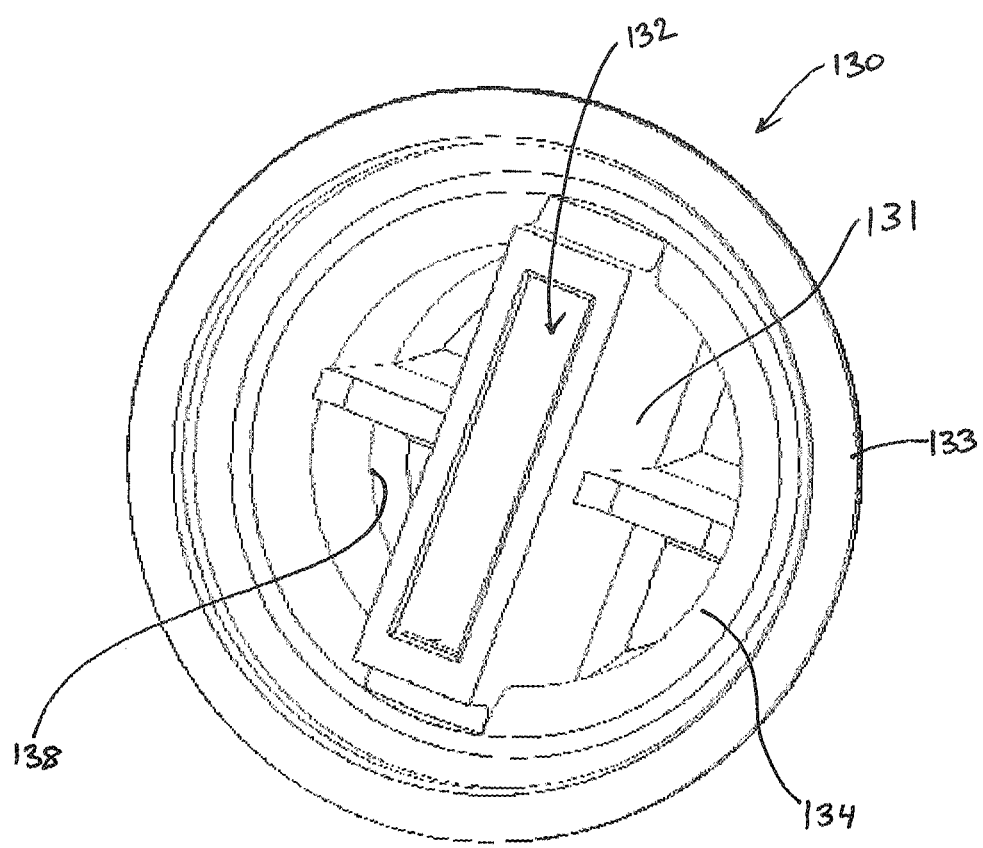
FIG. 22 is a perspective view of an alternate embodiment of a retainer element configured for incorporation within the disclosed counterbore tool embodiments.
Figure 23:
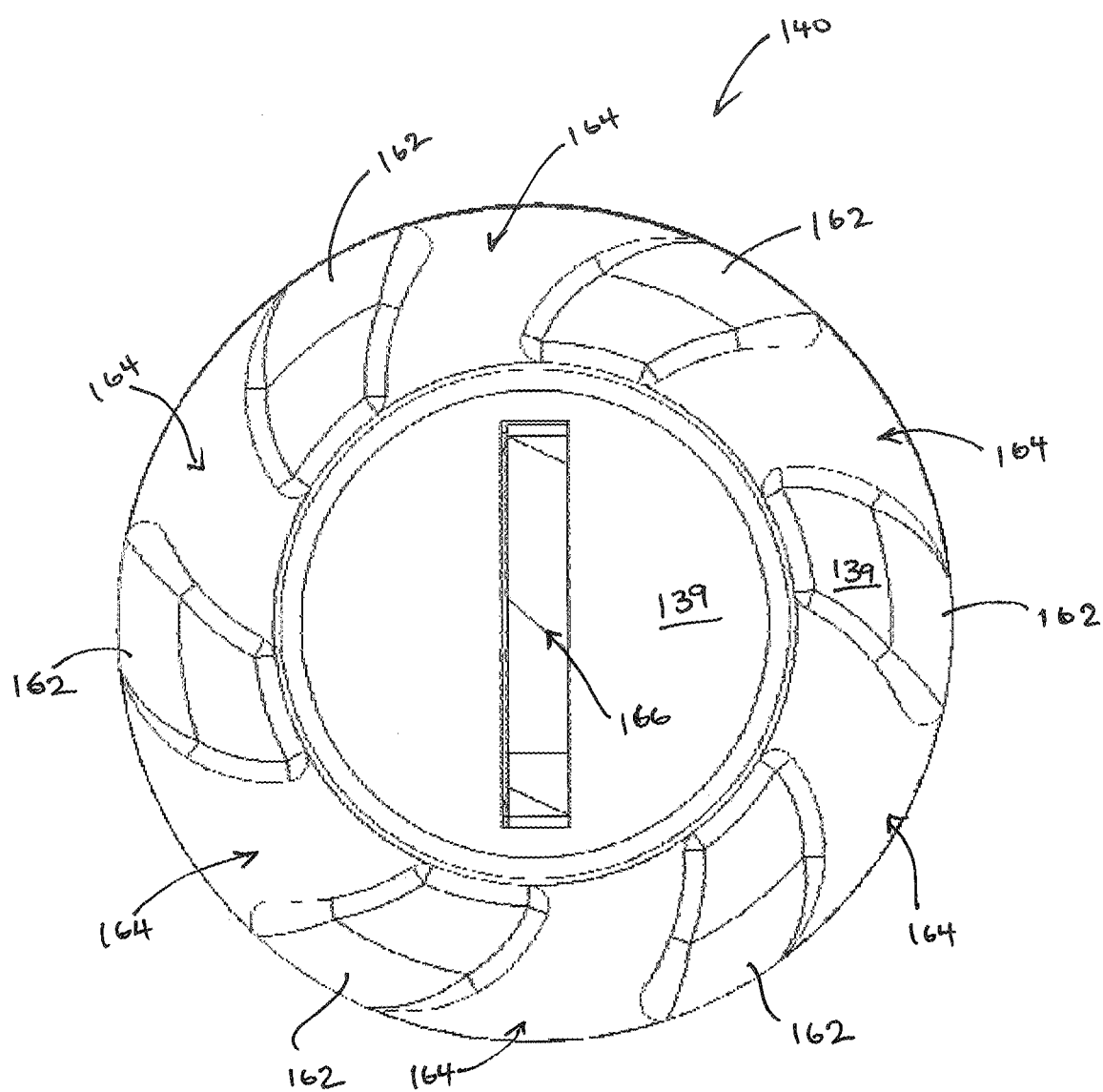
FIG. 23 is a bottom elevation view of the collar of the tool of FIG. 18.
Figure 24:
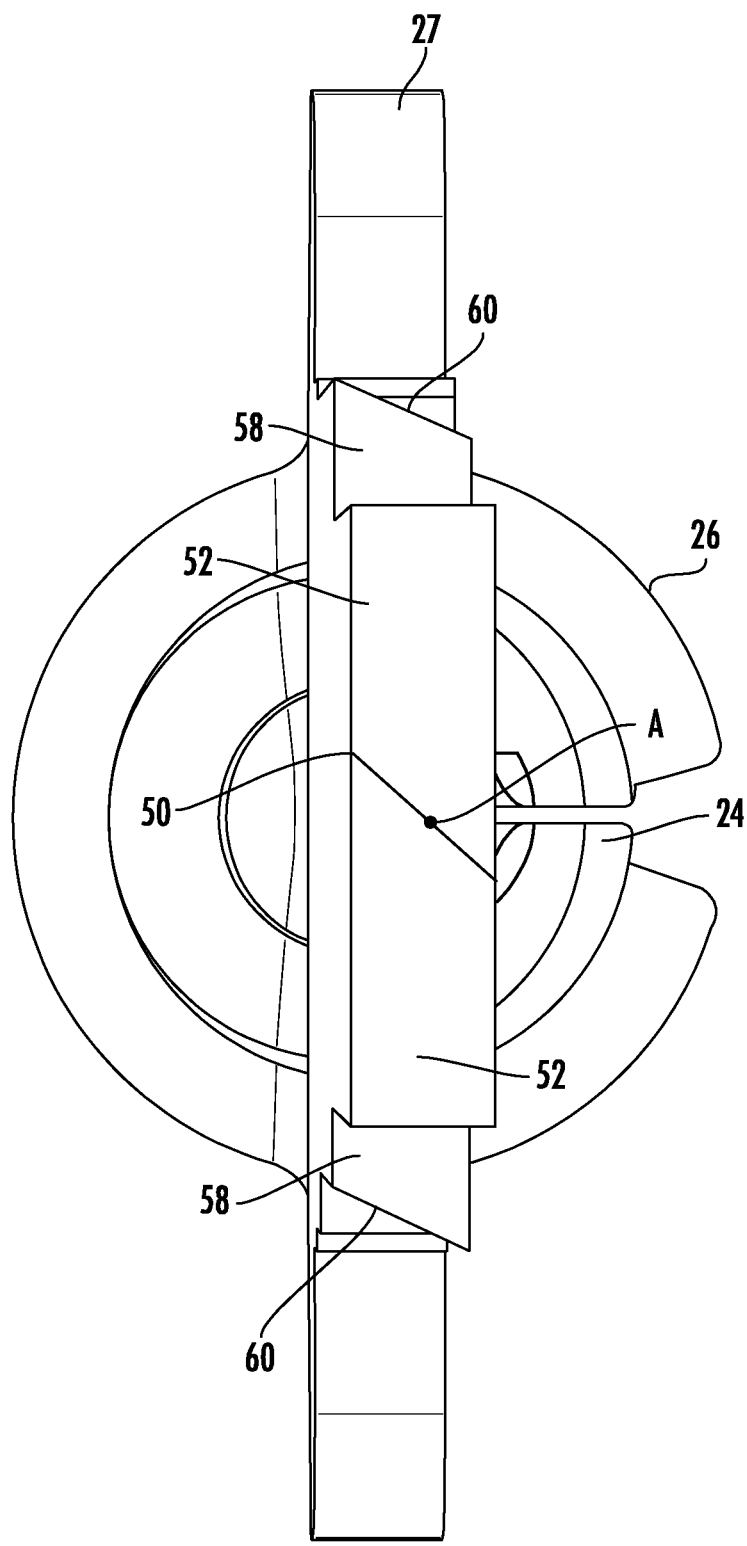
FIG. 24 is a bottom view of the working component for use within embodiments of the disclosed cutting tool with shading and depth for clarity of elements.

It can be seen most clearly in the bottom and side views of the working component 20 or 120 (FIGS. 5B, 12, 17, 21 and 22) as well as in perspective views, the flat sheet that forms the blade-like cutter 28 defines opposite flat faces with a cutting edge having a lateral thickness. The cutting edges are preferably ground at an angle relative to the flat sheet faces of between approximately 10° and approximately 40°, and even more preferably at an angle of between approximately 20° and approximately 30°. A particularly preferred embodiment includes a 25° ground angle relative to the flat sheet edge. This angle is shown generally as machined angle M in the bottom view of the working component 20 of FIG. 21, which includes depth and shadows to enhance clarity and understanding of the surfaces, elements and sub-elements and their relationships to one another. The respective cutting edges, 52, 59, 60, of the cutter 28 need not have identical ground angles to one another, however, in many embodiments they do. Preferably, each cutting edge is machined at a substantially constant angle relative to the flat sheet surface, however in some embodiments, the angle can vary over the length of a respective edge.

FIGS. 8-12 show many key dimensions and angles of the cutter 28 in a preferred embodiment. In one preferred embodiment, the edges form a vertex angle of approximately 118° about the truncated vertex-like tip 50. As shown, the cutter 28 has a lower bore cutting segment 54 of reduced diametrical width and an upper counterbore cutting segment 56 of enlarged diametrical width which forms diametrically opposed transition edges 58 adjacent the lower segment. Diametrically opposed edges 60 of the enlarged counterbore blade 56 portion are ground or machined on alternate sides to form cutting edges. The transition cutting edges 58 are also ground on opposite ends to form a lead cutting edge at the transition. Notably, these examples of preferred dimensions (FIGS. 8-12) and machined angles (FIG. 21) are applicable to all embodiments of the tool, including that discussed below and shown in FIGS. 17-24 as reference numeral 110 and an embodiment of the tool that only includes a bore cutting segment (i.e., omits a counterbore cutting segment; not depicted).

Figure 10:
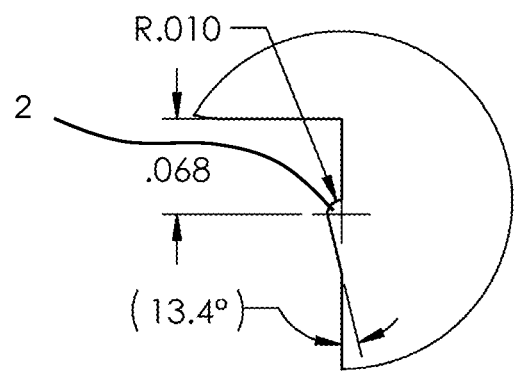
FIG. 10 is an enlarged view of a portion designated at B of FIG. 9.
Figure 11:
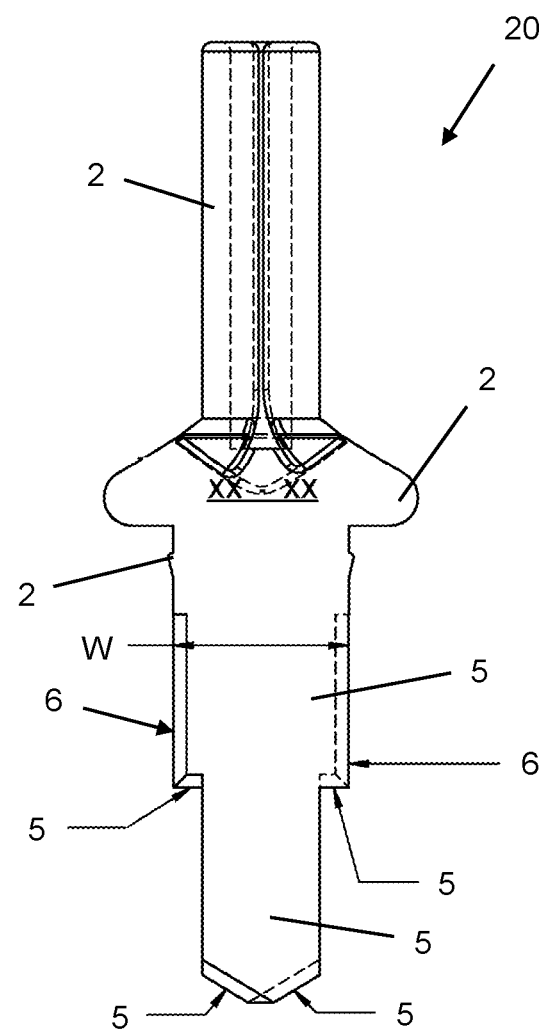
FIG. 11 is a front view, partly annotated, partly in diagram and partly in phantom, of the partly formed workpiece stage for the preform of FIG. 9.
Figure 12:
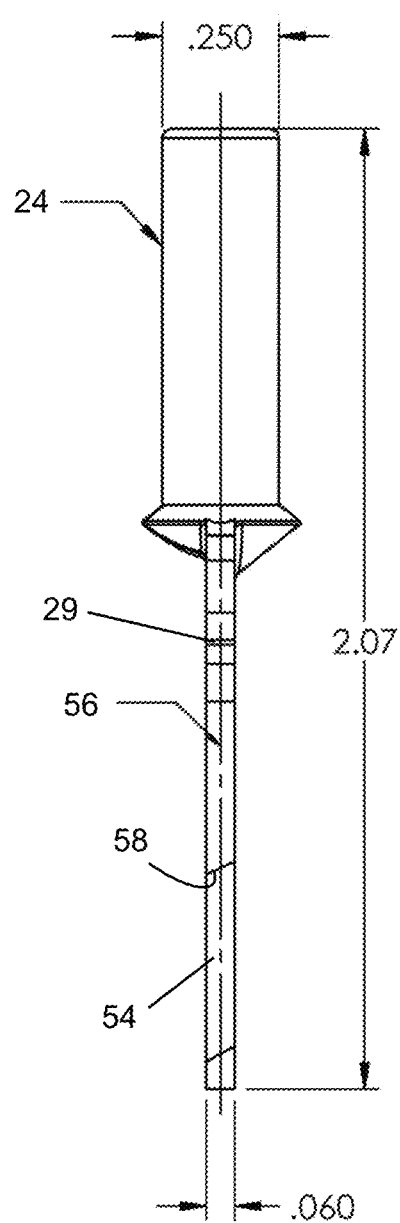
FIG. 12 is a side view, partly diagrammatic, of the working component of FIG. 11.
Figure 13A:
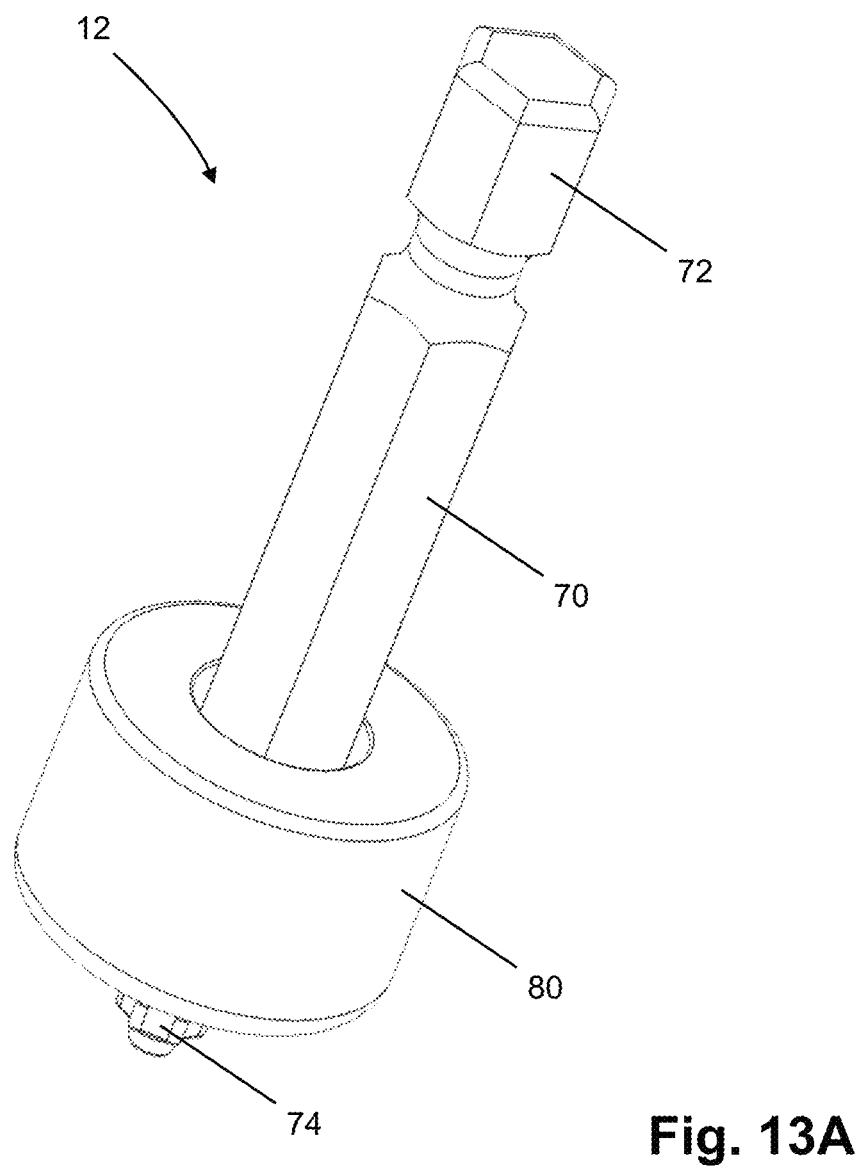
FIGS. 13A and 13B are perspective views of a of a setting tool in accordance with the present disclosure.
Figure 13B:
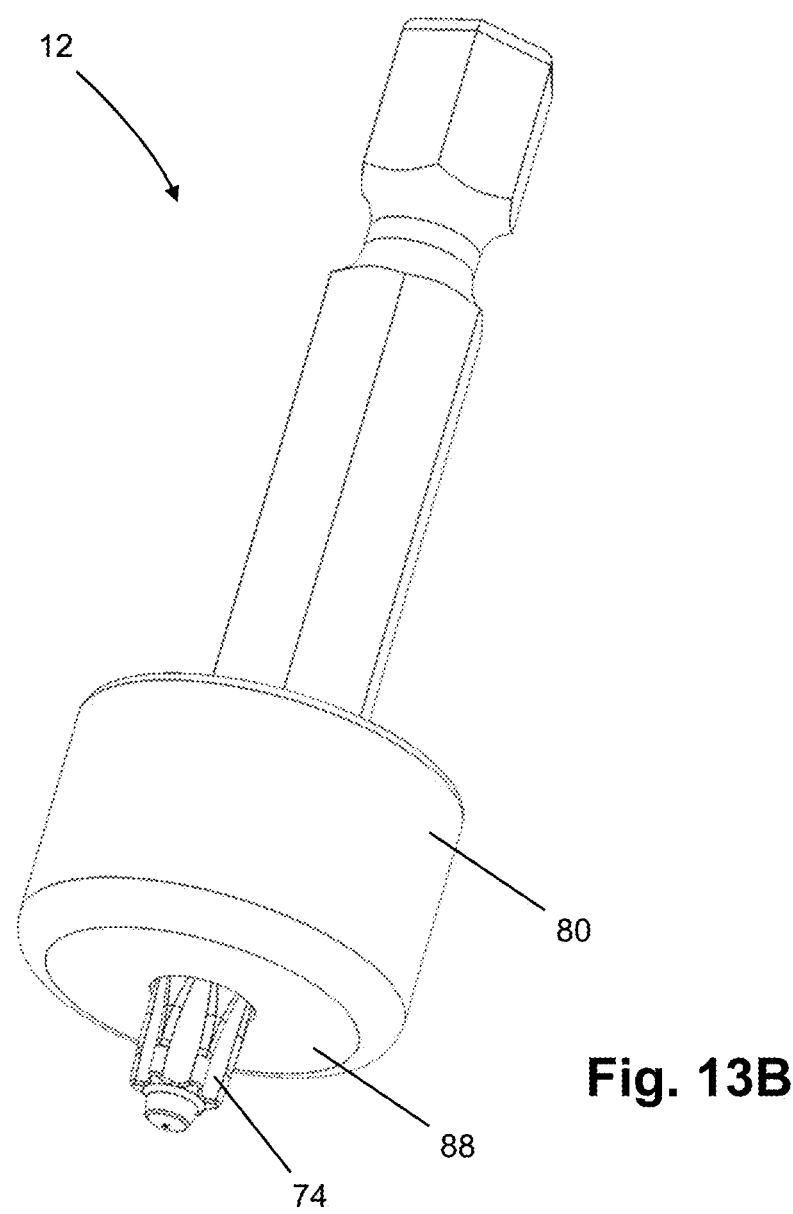
Figure 14:
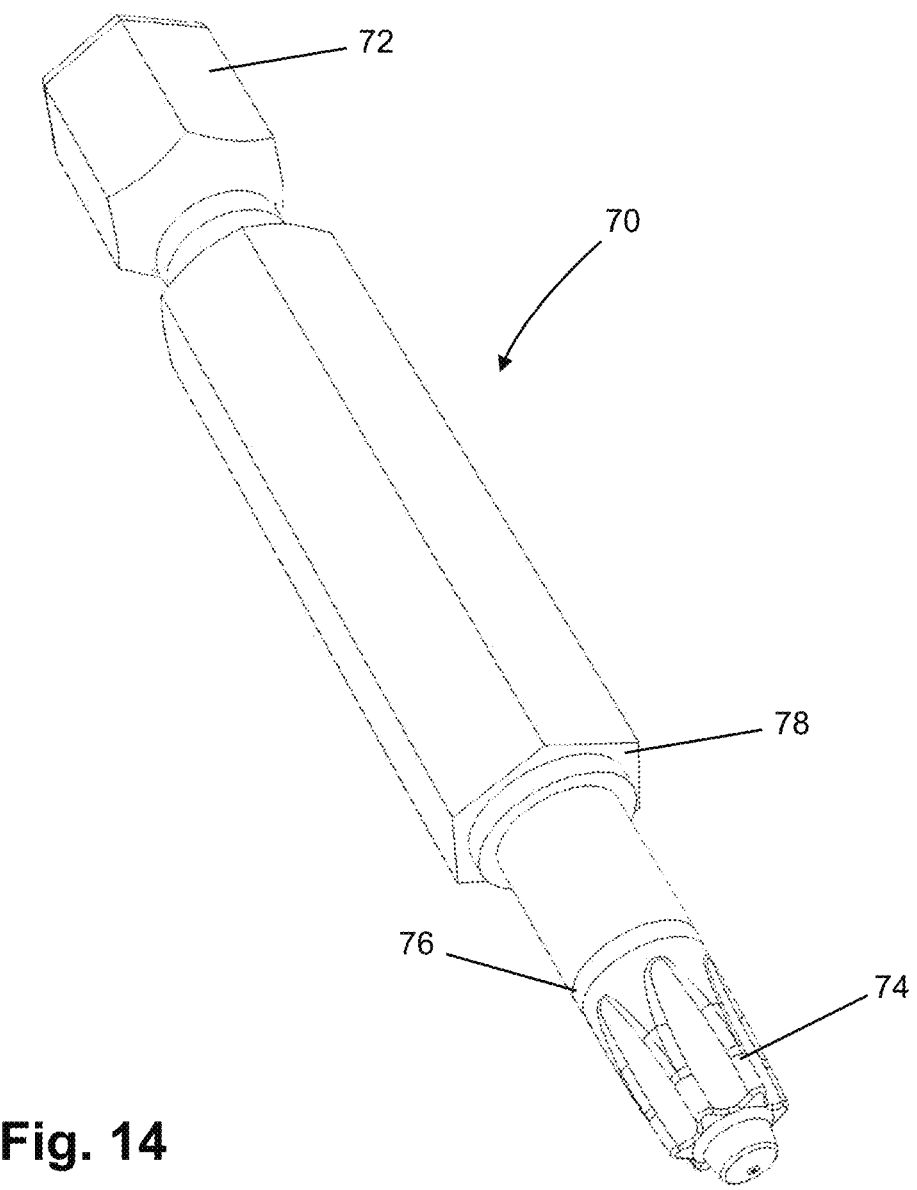
FIG. 14 is a perspective view of the tool of FIG. 13A with a collar removed.
Figure 15:
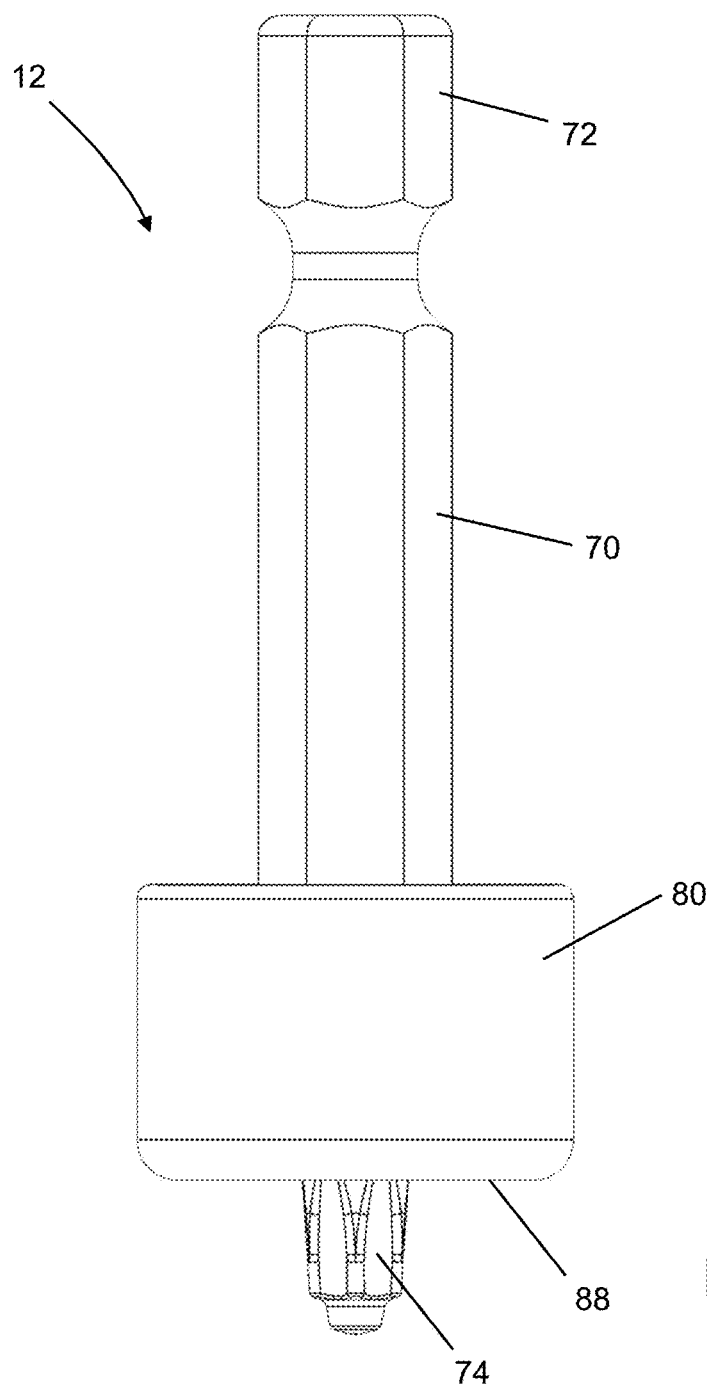
FIG. 15 is a front view of the setting tool of FIG. 13A.
Figure 16:
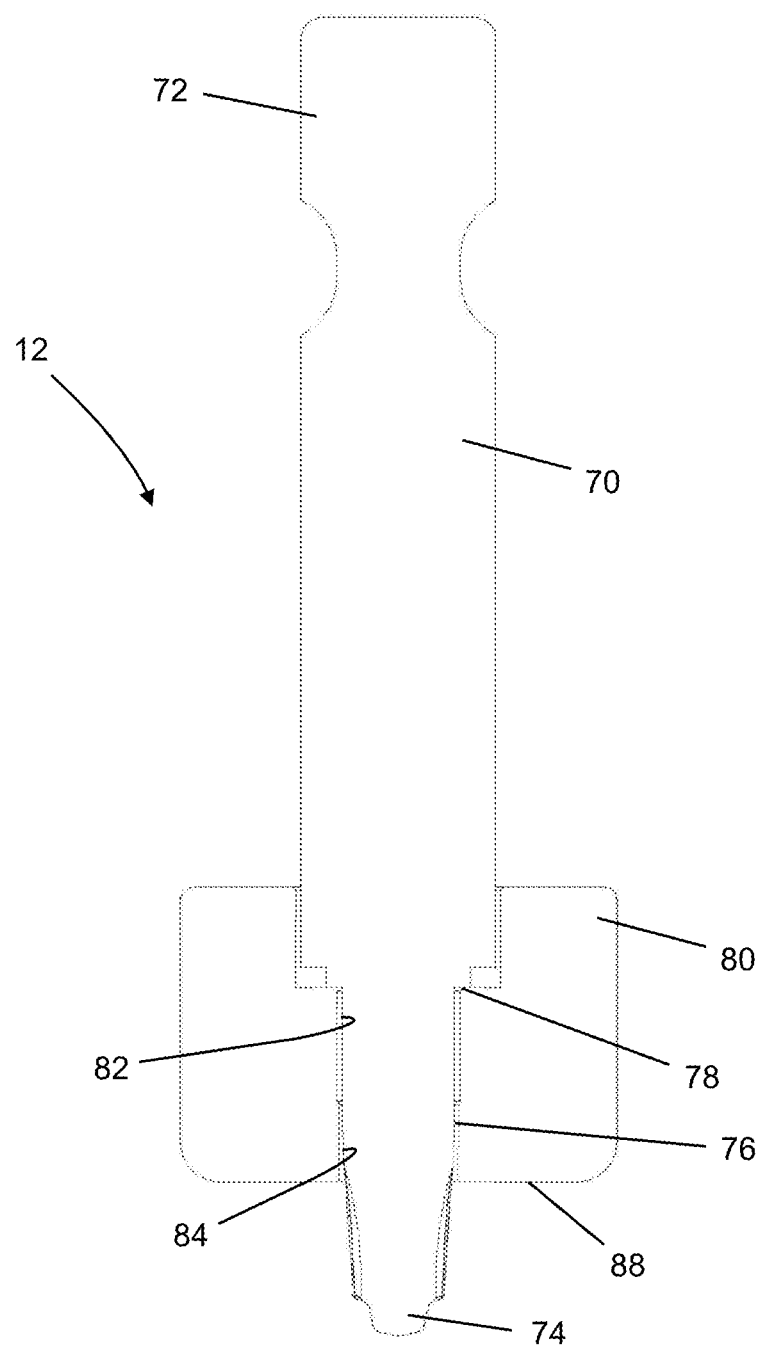
FIG. 16 is a central sectional view of the setting tool of FIG. 15.
Figure 17:
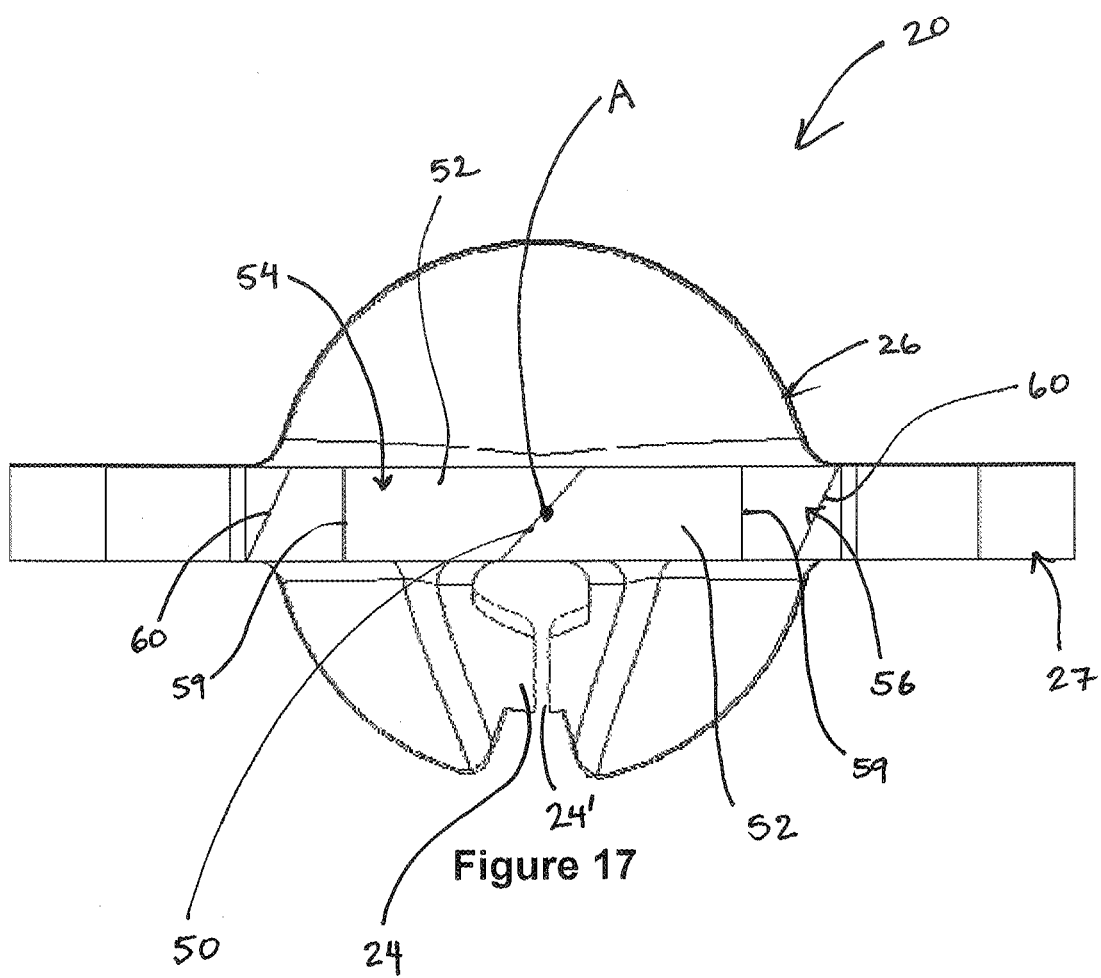
FIG. 17 is a bottom elevation view of the principle working component of the tool, showing the tip and cutting surfaces.
Figure 18:
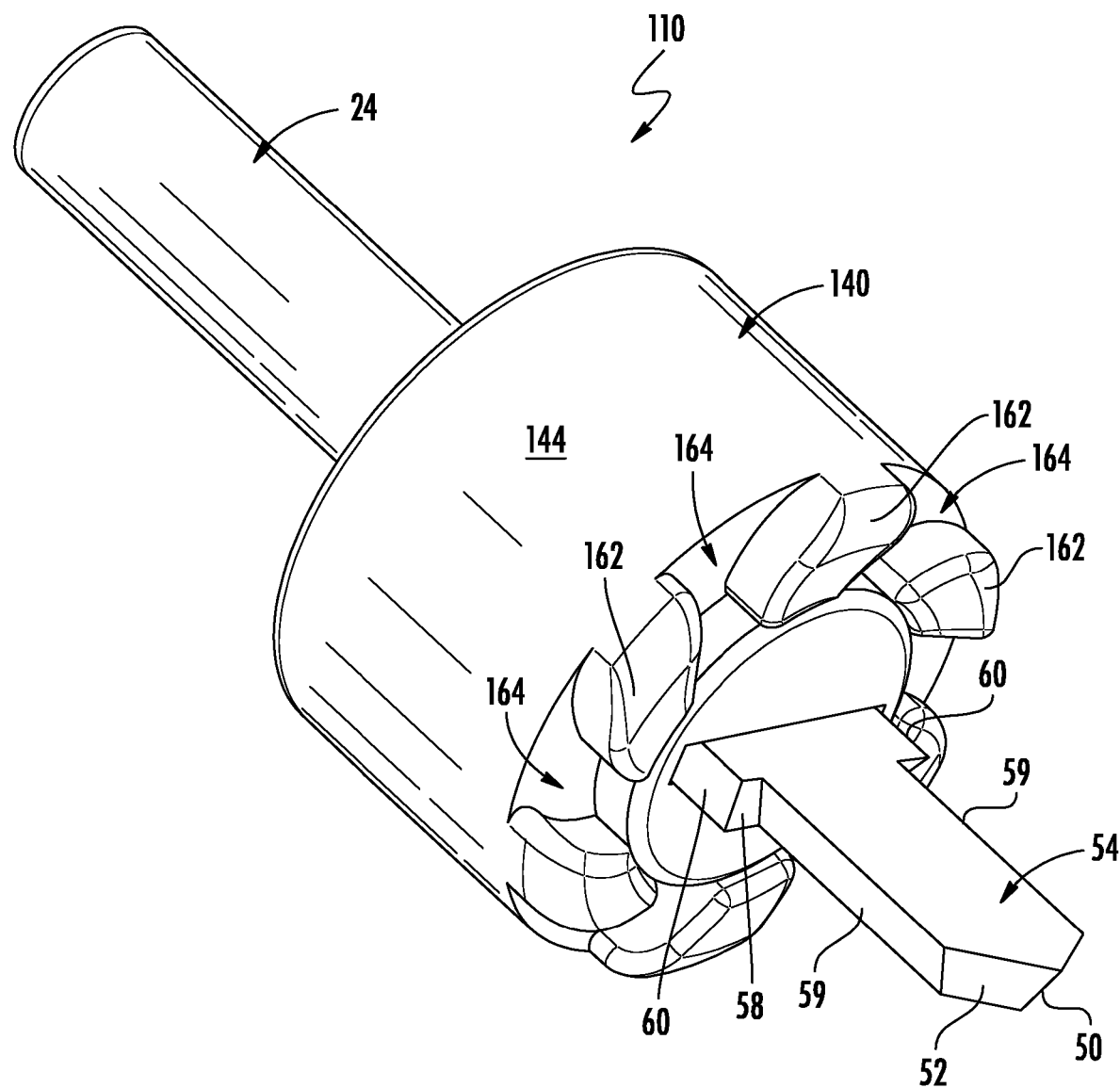
FIG. 18 is a bottom perspective view of another embodiment of a counterbore tool according to the disclosure.
Figure 19:
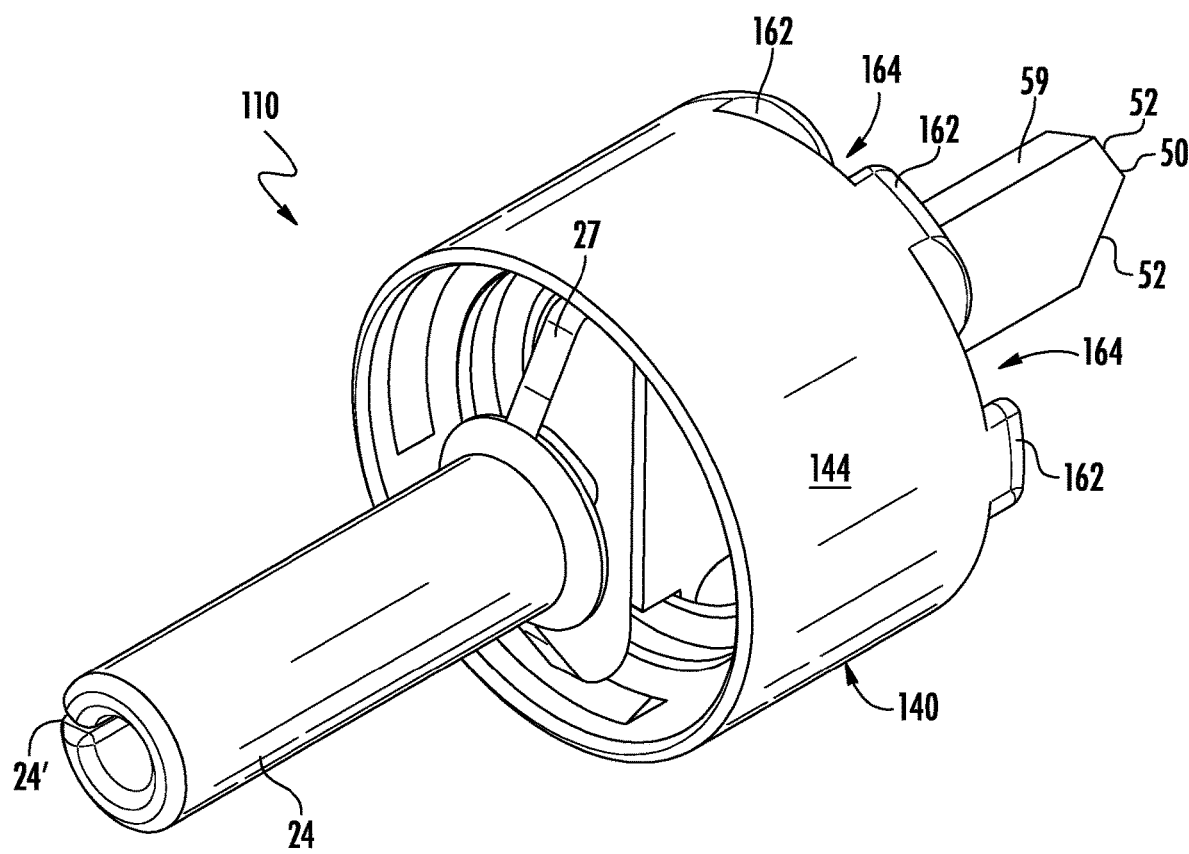
FIG. 19 is a top perspective view of the counterbore tool of FIG. 18.
Figure 20:
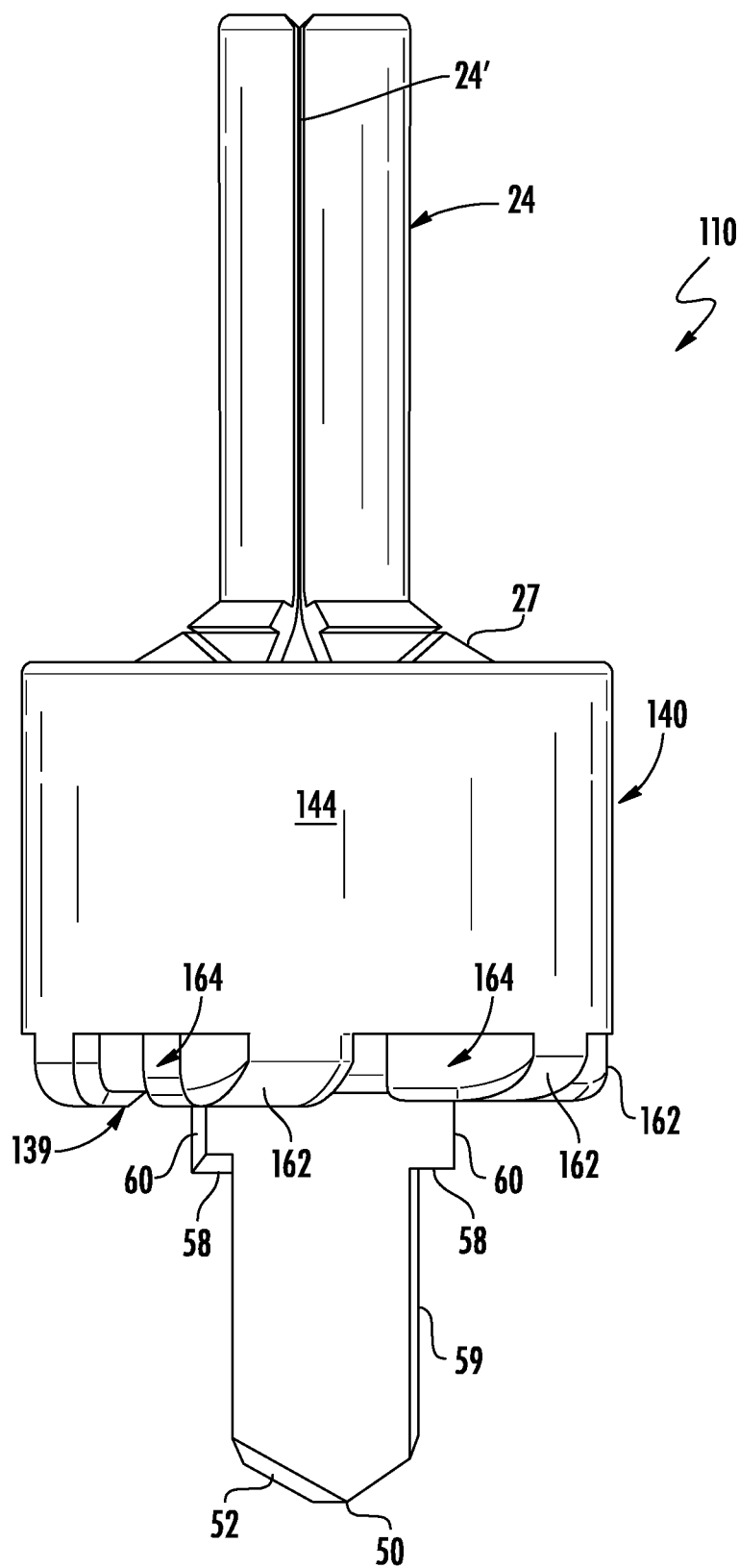
FIG. 20 is a side elevation view of the tool of FIG. 18.

It will be appreciated that in one preferred embodiment, component 20 has a length of approximately 2.07 inches, a shank 24 diameter of approximately 0.250 inches and a maximum cutting edge width of approximately 0.06 inches (see FIG. 12). The width W of the enlarged segment 56 defines the diameter of the counterbore C (FIG. 11). The width of the lower segment 54 defines the diameter of the bore B (FIG. 10).

With additional reference to FIGS. 4A-4C and 7, retainer 30 is preferably a plastic component which, except for a diametrical central axial slot 32 that receives the working component 20 when assembled, is axially symmetric. Retainer 30 includes an upper surface 31 with an upper circumferential lip 33, a medial disk 34 having a peripheral surface of a diameter less than that of the lip 33 with an underside 36 which is traversed by a friction-reducing engagement protrusion 35, and a lower disk-like body 38 with a substantially flat lower surface 39.

Figure 25:
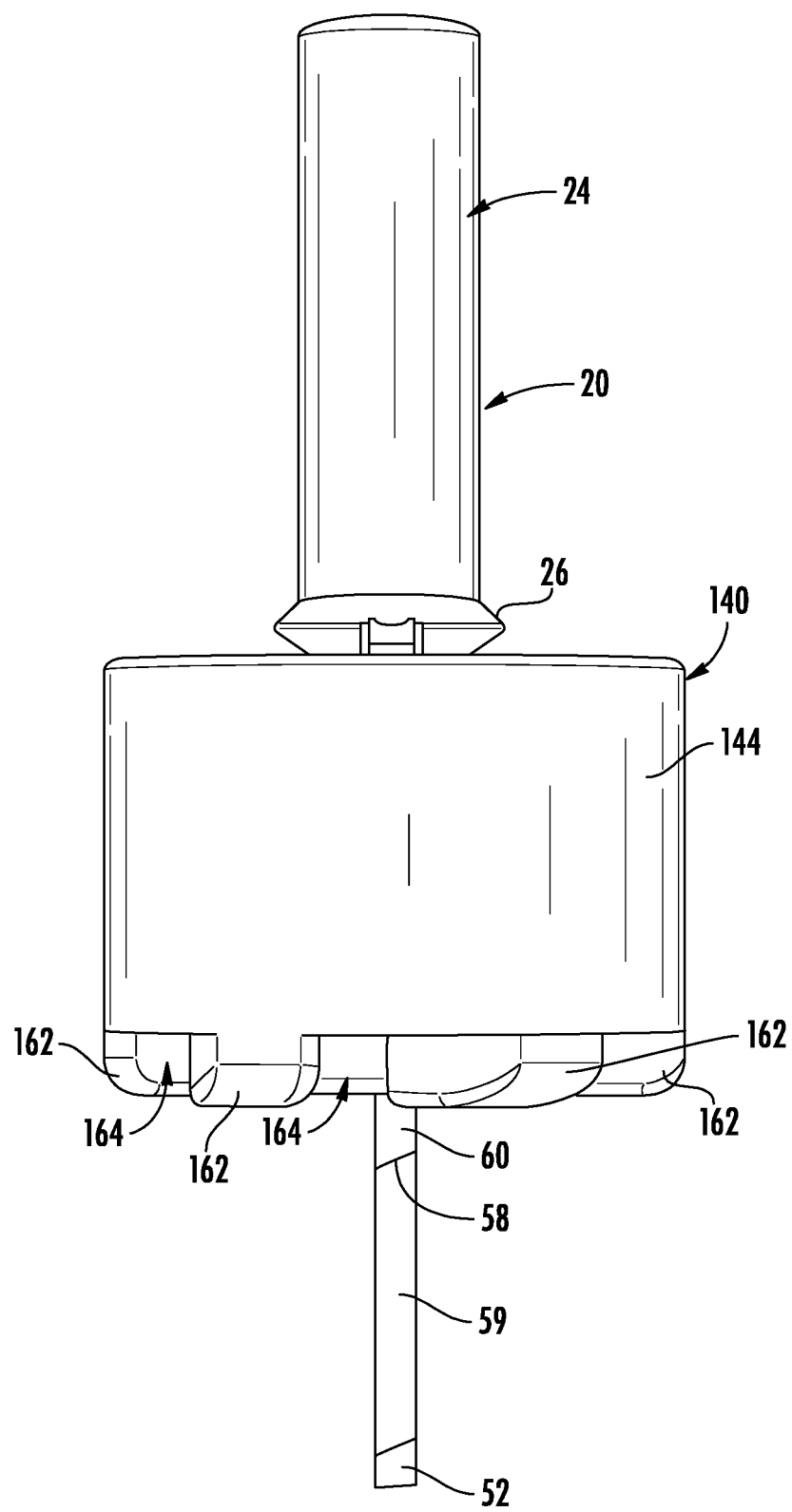
FIG. 25 is a side view of the tool of FIG. 18 with depth and shadowing for clarity.
Figure 26:
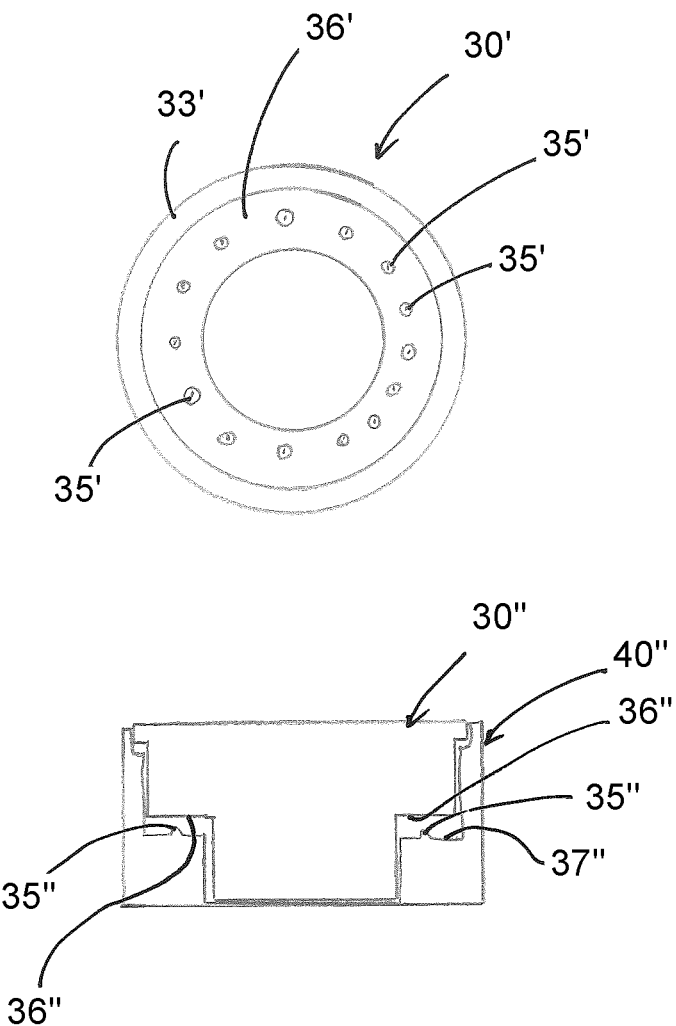
FIG. 26 is shows alternate embodiments of engagement protrusions as employed within the inventive tool.

In the embodiment of FIGS. 2-16, the engagement protrusion 35 is an annular ring-shaped friction-reducing projection extending circumferentially around the underside 36 coaxial to the axis A defined by the shank 24. The engagement protrusion may come in different forms such as spaced apart nubs or conical projections 36' typically spaced in a ring-shaped configuration coaxial to the central axis A. Such a configuration with spaced apart projections 35' in the underside 36' is shown in the bottom view of the retainer 30' of FIG. 25. The specific depicted embodiments discussed and shown heretofore include versions of the friction-reducing projection 35 (ring-shaped) or 35' (spaced projections) that are formed as downward projections from the underside 36/36' of the retainer 30/30' that abut a substantially flat upper surface formed on a ledge 37 within the collar 40. However, embodiments exist with the relative opposite positioning, i.e., upward projections 35" from the inner ledge 37" on the collar 40" that abut a substantially flat lower surface 36" on the underside of the retainer 30". See side view in lower drawing in FIG. 25. In all embodiments, the projections, 35, 35',35", are configured to substantially reduce the surface-to-surface abutment area between the retainer 30 and collar 40, which in turn substantially improves durability of the tool 10 via recuing friction when the tool is in operation.

The retainer slot 32 is sized and shaped to receive the upper segment 56 of the cutter, and may be substantially commensurate in cross section with the upper segment 56, so that the upper segment passes through the slot until the upper surface of the retainer 30 engages the shoulders 27. The tabs 29 engage the underside of the medial disk 34, trapping the disk between the shoulders 27 and tabs to retain the retainer 30 to the component 20 axially. It will be appreciated that the retainer is rotatably fixed to component 20.

Collar 40 is a quasi-cylindrical member preferably formed of plastic material or similar, which receives and is secured to the retainer axially in a fashion which permits the component 20 and retainer 30 to rotate relative to the collar. As shown, the collar 40 has an open top defined by a cylindrical upper wall 44 that is sized to receive the lip 33 of the retainer. In this regard, the collar 40 also defines an inner circumferential shelf 41 and a plurality of angularly spaced inward protrusions 42 which capture the upper surface 31 or lip 33 of the retainer so that the collar 40 is axially retained to the retainer 30 while independently rotatable thereto.

The collar 40 has an open top and a lower end which includes a lower smooth annular surface 46 about a central opening 48. In operation, the smooth annular surface 46 engages/abuts against the fascia or other building member exterior surface and essentially functions as a stop to properly establish the depth of the counterbore C. Some embodiments may include a resilient material or pad on the lower surface 46 to further protect the fascia surface from scuffing. Discussed in detail below is another embodiment of the collar 140 with a lower surface that is formed partially of circumferentially spaced apart nubs abut the outer peripheral portion of the lower abutment surface (FIGS. 18-25). While FIGS. 18-25 depict a version of the tool 110 with a smaller portion of the counterbore cutting segment 156 exposed for cutting a shallower counterbore C, the elements and sub-elements included therein, including the collar 140, are usable within a version of the tool like that shown as reference numeral 10 for cutting a deeper counterbore C. As shown most clearly in FIG. 6, when assembled, an inner annular shelf 45 with a bearing surface is engaged by the engagement protrusion 35 of the retainer. In this manner, the engagement protrusion 35 provides a "quasi-floating" relationship between the retainer 30 and collar 40 with a contact interface between the retainer 30 and collar 40 that is configured with significantly reduced (minimal) surface-to-surface contact between the collar and the retainer.

It will be appreciated that when the counterbore tool 10 is rotatably driven, the collar surface 46 ultimately engages against the fascia F and is rotationally fixed while the retainer 30 and the cutter 20 are rotated while driven during the latter portion of the counterbore forming process. In this manner, the counterbore C is formed at a consistent predetermined depth without marring the exterior surface of the fascia. It will also be appreciated that the quasi-floating configuration with clearance between the flat underside 36 of the retainer 30 and the annular shelf 45 of the collar 40 and minimal surface-to-surface contact at the protrusion 35/shelf 45 interface minimizes friction between the retainer and the collar and any heat generated therefrom. The distance between the collar surface 46 and the transition edges 58 of the counterbore cutting section 56 effectively defines the depth of the counterbore.

With reference to FIGS. 13-16, a setting tool 12 comprises a bit 70 with a shank end 72 and a fastener coupling end 74. Adjacent the coupling end is a slight outward circumferential protuberance 76. The bit also includes an intermediate transverse shoulder 78.

A rotatable collar 80 is preferably formed from plastic and includes a central stepped bore 82. The bore forms an annular shoulder 84 which is engaged by the shoulder of the bit. The diameter of the bore and the reduced bore portions are sufficient that the collar may be forced over the bit protuberance 76 so that it is retained between the protuberance and the shoulder, and the collar 80 is rotatable relative to the bit 70.

The lower end surface 88 of the collar preferably has a smooth surface 88 so that when the screw is set at the final driving stages, the surface engages the fascia and is rotatably fixed relative to the fascia while the setting tool continues to rotate. This rotationally fixed disposition of the collar prevents marring on the fascia board during the setting of the screw. The surface 88 also functions as a stop to limit the penetration depth of the screw S.

While not depicted, an embodiment of the setting tool 12 includes a retainer mounted within the collar 80 that is rotationally independent from the collar and rotationally fixed to the bit 70 (like those of the engagement protrusion 35 and quasi-floating retainer 30 and collar 40 of the cutting tools 10/110).

With reference to FIGS. 18-24, another embodiment of the counterbore tool 110 is shown. This embodiment 110 is similar or substantially identical in many ways to the embodiment described above, except that it is configured to cut a counterbore C with a shallower depth which is sized to substantially match the depth or height of a head of a screw S (i.e., without leaving space for a plug P). The tool 110 includes a principal working component 120 received by and rotatably fixed to a retainer 130. The retainer 130 is mounted in a collar 140 that is rotatable relative to the retainer 130 and the component 120. In this way, the tool 110 operates in the same manner as the tool 10.

Like the earlier embodiment, the principle working component 120 includes a lower bore cutting segment 154 and an upper counterbore cutting segment 156 with opposite transition edges 158 between the lower opposed cutting edges 159 and the upper opposed cutting edges 160. The primary difference between this embodiment of the tool and that of FIGS. 1-17 is that the upper counterbore cutting segment 156 and its cutting edges 160 extend axially from the lower abutment surface 139 of the collar 140 a shorter distance than in the earlier embodiment, such that it cuts a counterbore of a relatively reduced depth. In the depicted embodiment, the working component 120 has substantially identical dimensions as the working component 20, and is combined in the tool 110 with a collar 140 that is longer than the collar 40 of the earlier embodiment, thereby concealing a greater axial length of the counterbore cutting segment 156. An embodiment of a cutting tool for cutting a reduced depth counterbore can also be formed with a working component 120 with counterbore cutting segment 156 that is shorter than that of the earlier embodiment and a collar 140 of the same or similar length as that of the earlier embodiment. The key differentiation between this embodiment of the tool 110 and the earlier embodiment tool 10 is that the resulting counterbore C that is cut by the tool 110 is of significantly less depth so as to be configured to approximate the depth of the fastener head without space to receive a plug P after installation of the fastener F.

Figure 3C:
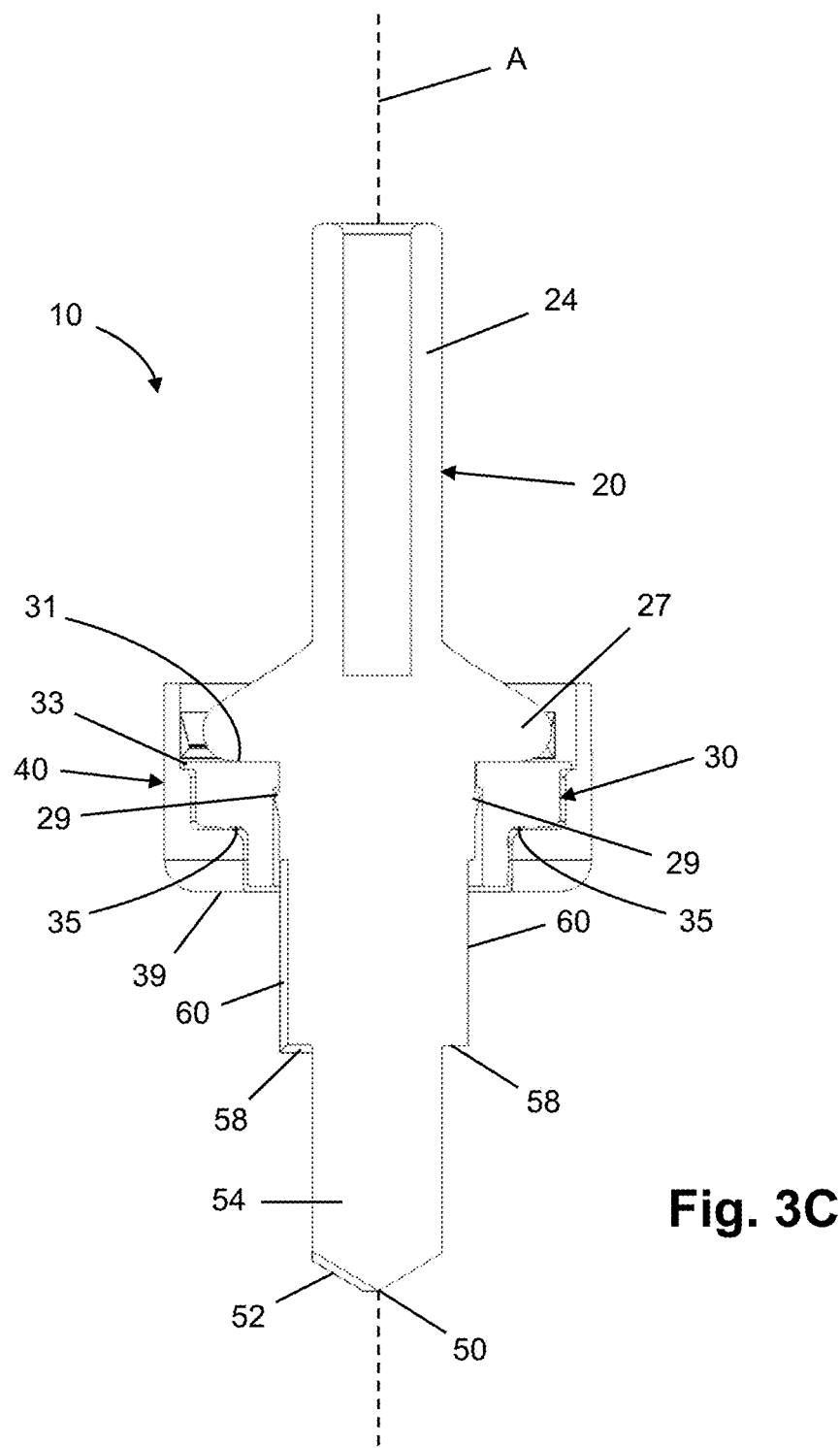
FIG. 3C is a central sectional view of the counterbore tool of FIG. 3A.
Figure 4A:
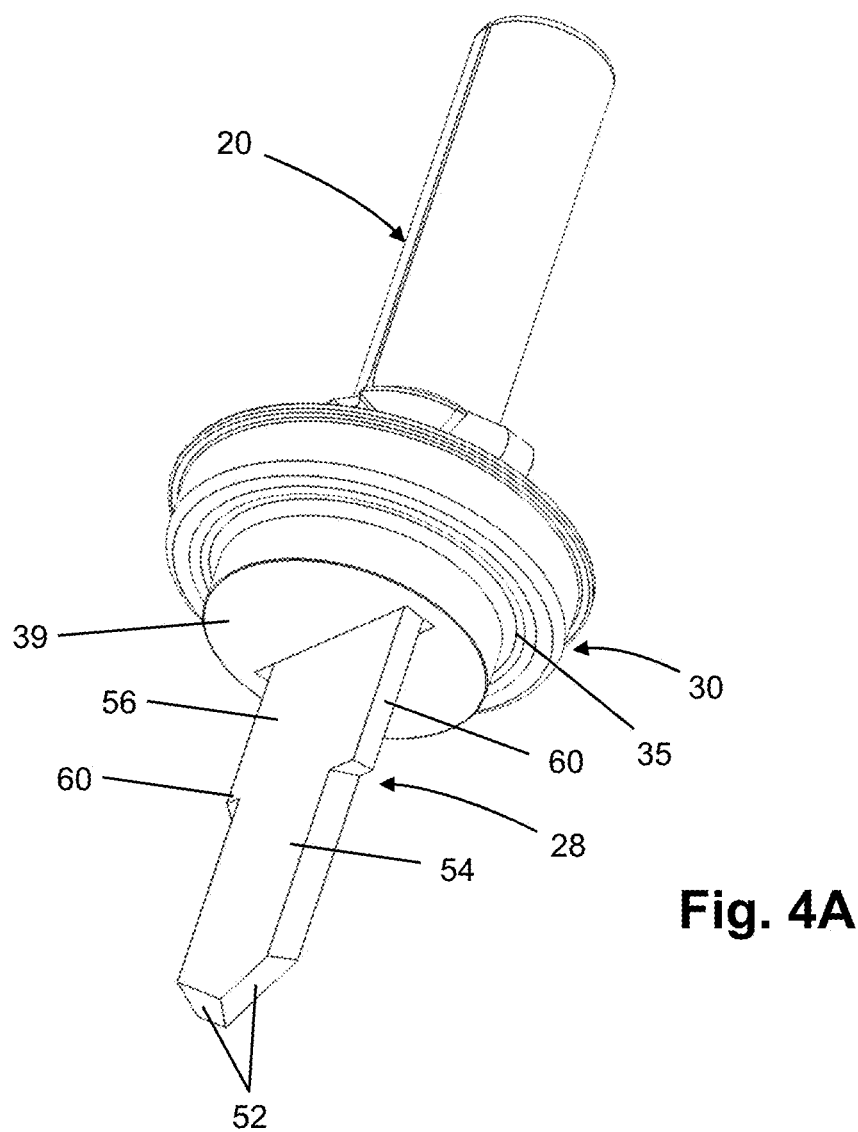
FIGS. 4A and 4B are perspective views of the tool of FIGS. 3A and 3B with a collar being removed.
Figure 4B:
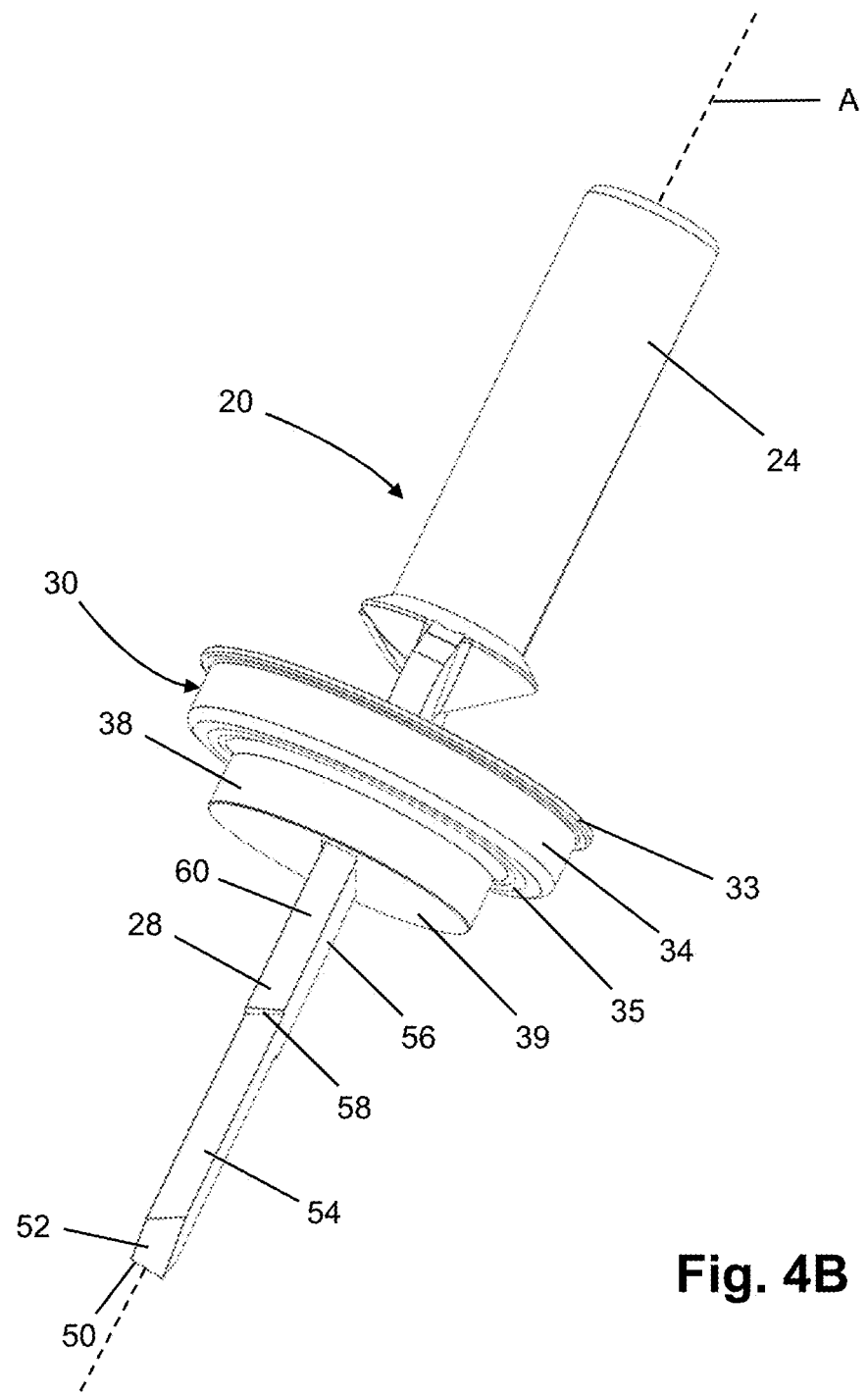
Figure 4C:
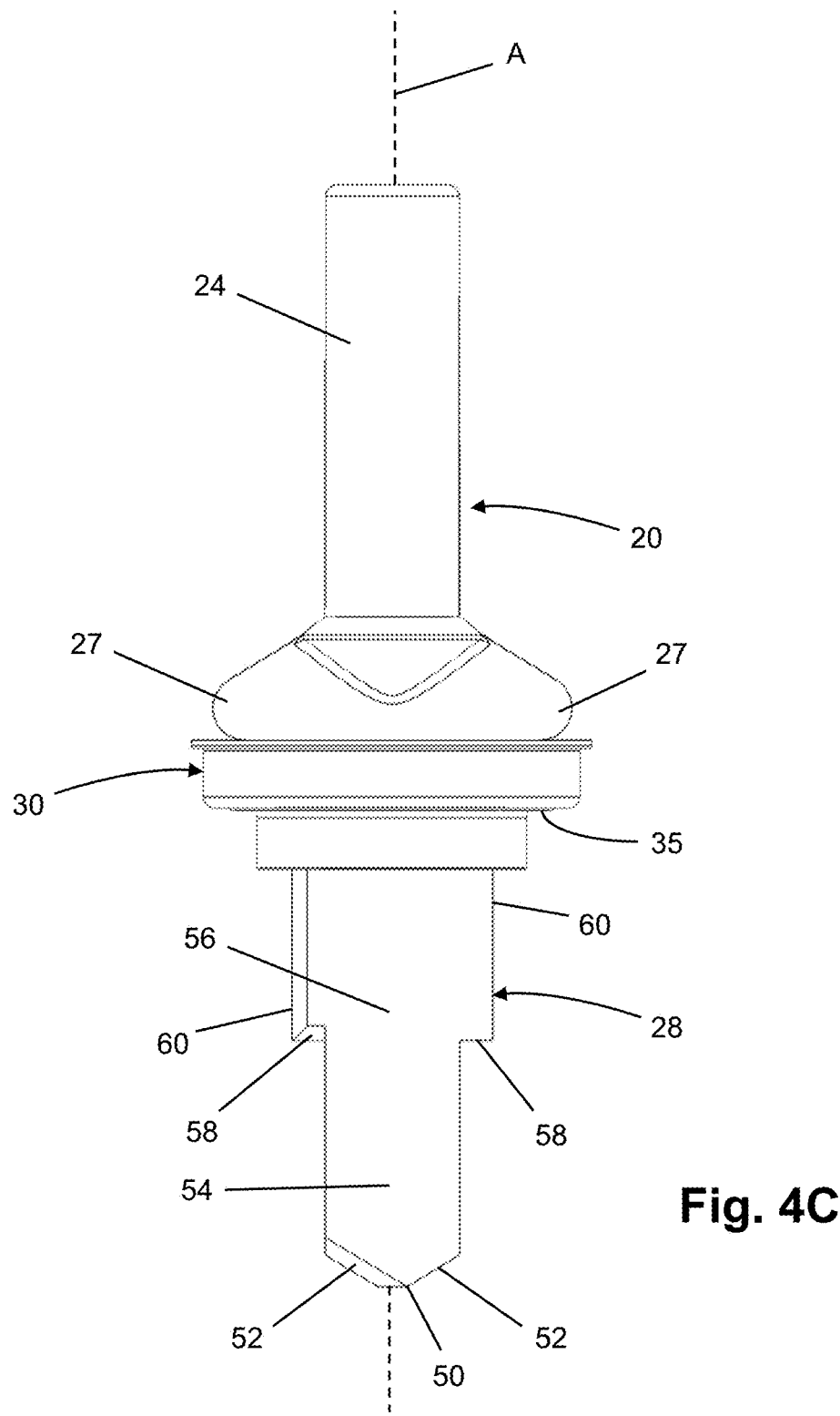
FIG. 4C is a front view of the counterbore tool portion of FIG. 4A.
Figure 5A:
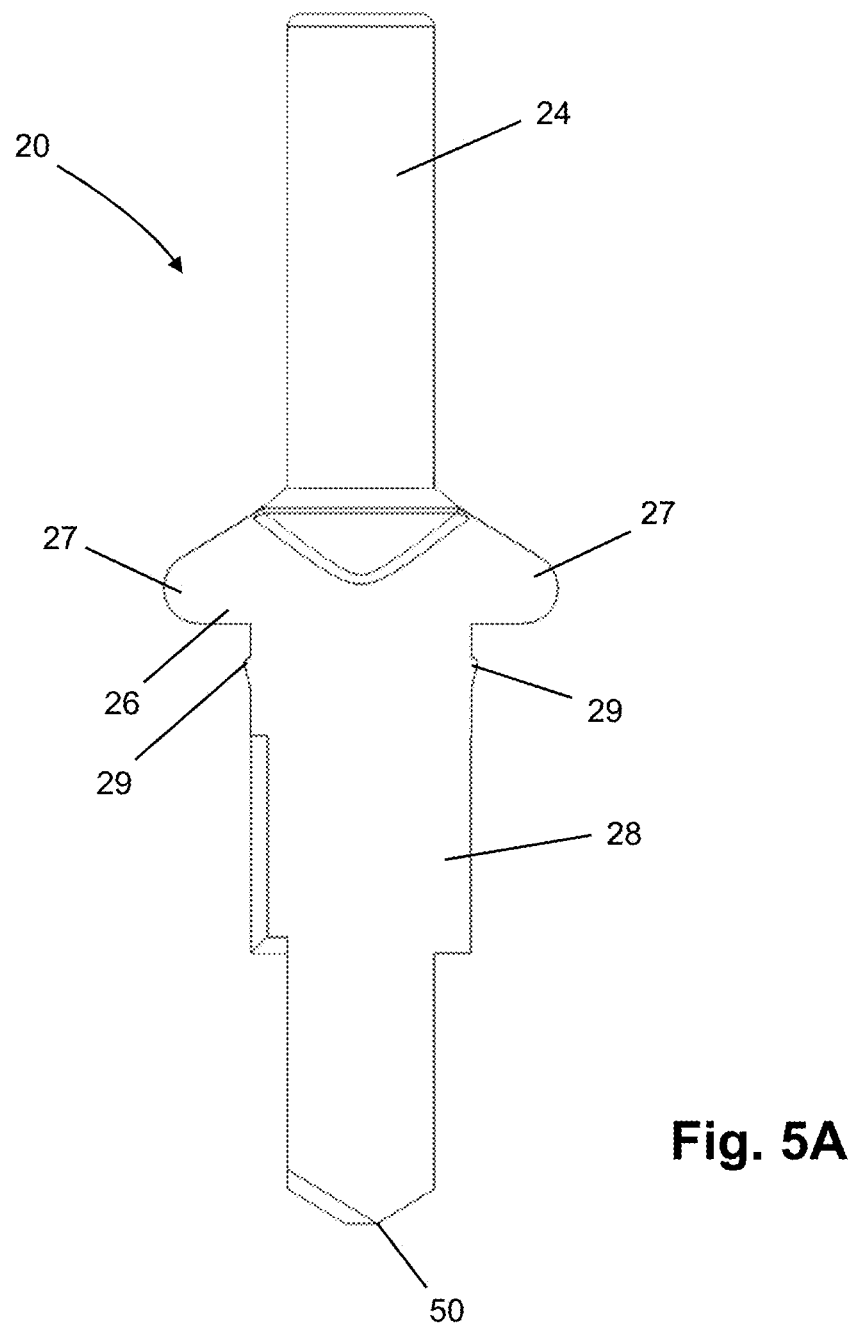
FIGS. 5A and 5B are a front view and a side view of the working component of the disclosed tool.
Figure 5B:
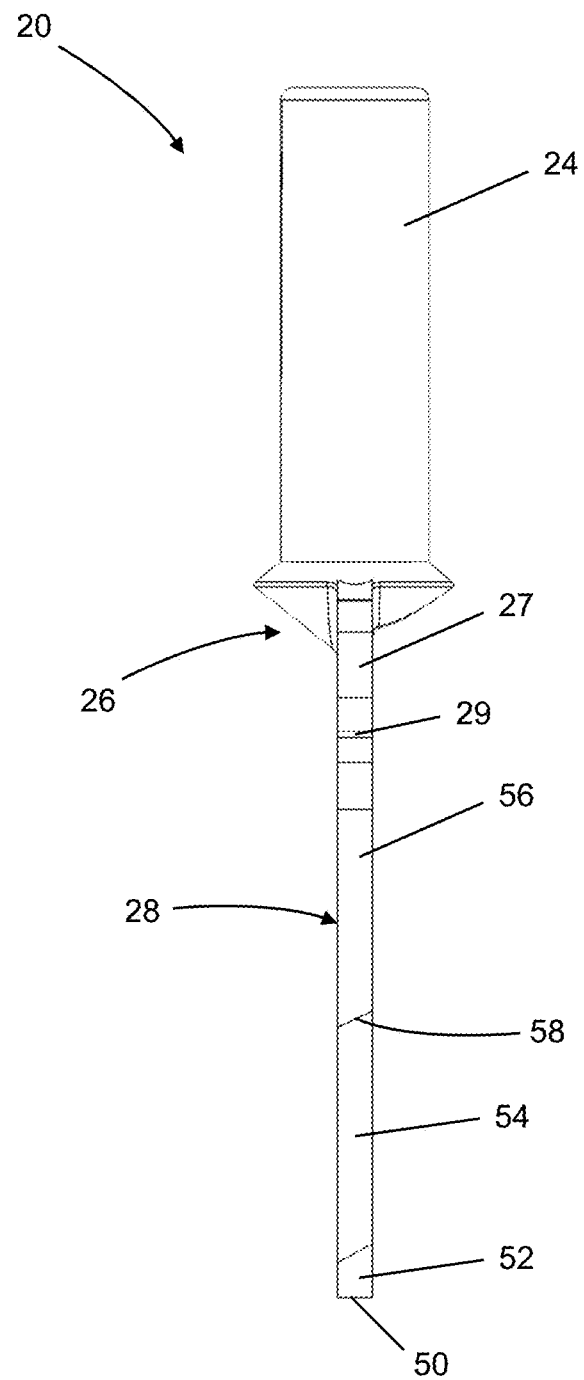
Figure 6:
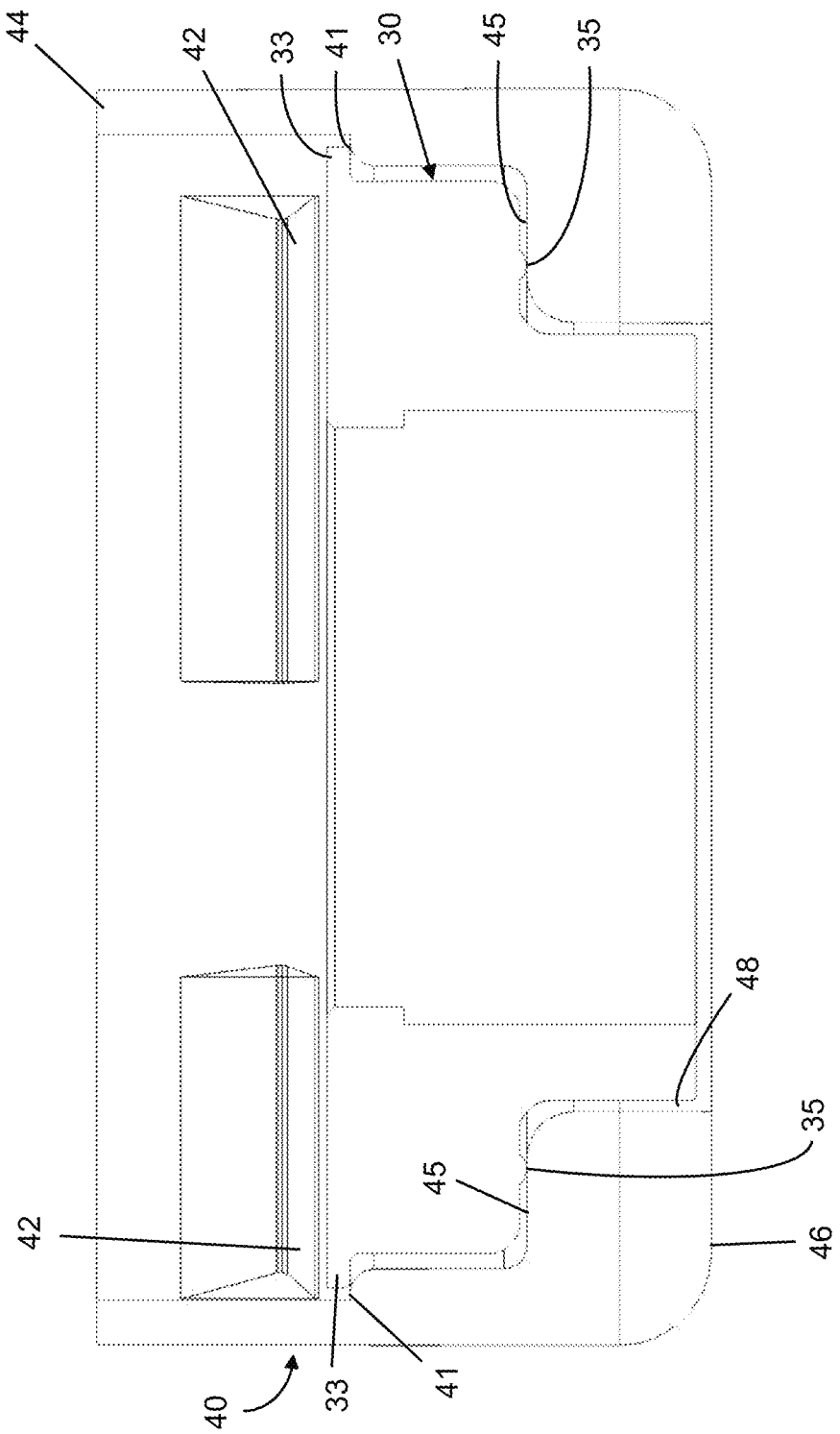
FIG. 6 is an enlarged sectional view of the assembled collar and retainer of FIG. 3B with the working component removed.
Figure 7:
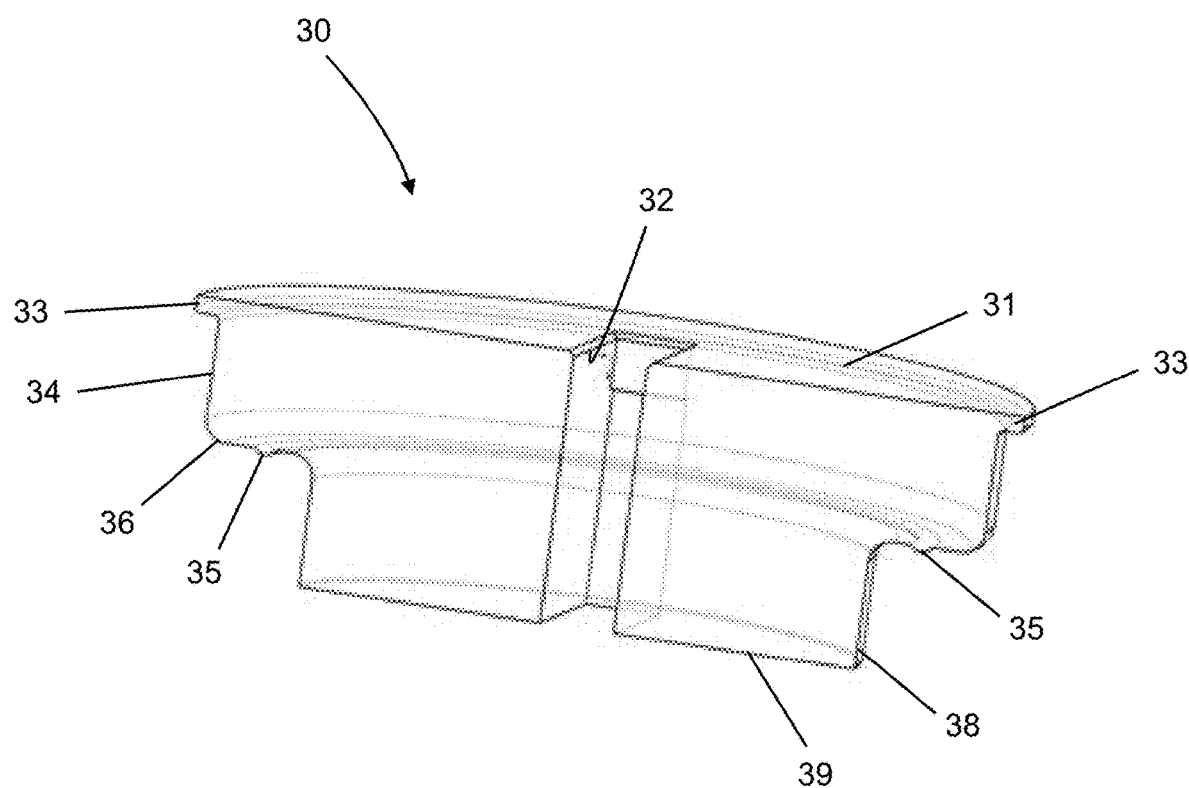
FIG. 7 is an enlarged perspective view of a retainer sliced in half to illustrate detail for the counterbore tool of FIG. 3A.

Also shown in FIGS. 18-20 and 23, the collar 140 includes a side wall 144 and has a lower surface 139 that abuts the building member during operation that is defined by a plurality of circumferentially spaced nubs 162 rather than a completely flat lower surface, like that depicted as 39 in FIGS. 3A-3C. The nubs 162 can take a curved shape, as depicted, to increase the smoothness of abutment with the building member F and further reduce the possibility of scuff marks. The configuration of the nubs 162 with open space 164 between each nub reduces the total surface-to-surface contact between the collar 140 and building member F, thus, further reducing the possibility of scuffing. Additionally, the open spaces between each nub 162 provide an area for drilled material or shavings to accumulate without obstructing operation of the tool. While not specifically depicted, embodiments of the tool exist that include a collar with spaced nubs like that shown in the latter embodiment of the tool 110 in a tool configured to provide a deep counterbore C for receipt of a plug P.

In the depicted and described embodiments of the tool, the working component is preferably formed of a single sheet of metal, such as steel, that is stamped (see FIG. 8), machined and bent into a configuration like that depicted herein. The steel may optionally be treated with a coating and/or heat treated by any methods as known in the art. The embodiments of the retainer and collar are preferably formed of a resilient non-metallic material, such as a polymer that exhibits high stiffness and rigidity, low friction, and high dimensional stability. Preferred embodiments are formed of a thermoplastic, and more specifically from an acetal, polyacetal, polyformaldehyde, polyoxymethylen (POM). In a particularly preferred embodiment, the retainer and collar are formed of Delrin® branded acetal homopolymer. The retainer and collar need not be formed of identical materials, though they may be.

Additionally, individual features, elements and sub-elements in the tool 10 and those of the tool 110 may be interchanged without departing from the inventiveness of the tool. The particular combination of features, elements and sub-elements of the depicted products is not limiting. Specifically, embodiments exist that are used for cutting deep counterbores C for receipt of plugs P (similar to the tool 10), but which employ a collar with spaced nubs and/or retainer with open top like those shown respectively as reference numerals 140 and 130. Likewise, embodiments of the tool for cutting shallower counterbores C to approximate the depth of the fastener head without a plug P employ a collar and/or retainer like those shown as reference numerals 40 and 30. Additionally, embodiments of a drilling tool exist which omit a counterbore cutting segment, i.e., tools for drilling a single bore, but which include a quasi-floating collar/retainer for stopping axial movement like those depicted and described herein.

Further, the depicted embodiments of the tool 10/110 show a continuous ring-shaped engagement protrusion 35/135 integrally extending from the retainer underside surface 36/136 for maintaining the collar and retainer in the quasi-floating rotationally independent relationship. However, this is non-limiting to the inventive concepts disclosed herein. Embodiments exist with engagement protrusions extending from a location on the collar. Additional embodiments of the protrusion exists as well, including without limitation, the spaced apart protrusions (35') on the retainer and/or upward projections 35" from a location on the collar.

While preferred embodiments of the foregoing have been set forth for purposes of illustration, the description should not be deemed a limitation of the invention herein. Accordingly, various modifications, adaptations and alternatives may occur to one skilled in the art without departing from the spirit and the scope of the present invention.

The invention claimed is:

1. A drilling tool comprising:
   a working piece comprising a distal shank defining a central axis and a cutting section with a proximal tip;
   a collar having a substantially cylindrical outer wall coaxial to the central axis and a bottom wall defining an inner surface and outer surface, the collar circumscribing the working piece with the outer wall concealing a portion of the working piece;
   a retainer extending from the working piece in a rotationally fixed relationship and defining a bottom surface facing the inner surface of the collar bottom wall, the retainer being received by the collar positioned within the outer wall in a rotationally independent relationship; and
   an engagement protrusion between the bottom surface of the retainer and inner surface of the bottom wall for providing axial clearance between the bottom surface and inner surface, the engagement protrusion providing sliding engagement between the bottom surface of the retainer and inner surface of the bottom wall of the collar.

2. The drilling tool of claim 1, wherein the engagement protrusion is integral to the retainer and extends from the bottom surface toward the inner surface of the collar.

3. The drilling tool of claim 1, wherein the working piece is formed from a single sheet of metal and the cutting section includes machined surfaces forming cutting edges.

4. The drilling tool of claim 3, wherein each of the cutting edges is machined at an angle of between approximately 15° and 35° relative to the sheet.

5. The drilling tool of claim 4, wherein the machined surfaces are machined at an angle of approximately 25° relative to the sheet.

6. The drilling tool of claim 1, wherein the cutting section comprises a distal bore cutting subsection and an enlarged counterbore cutting subsection proximal of the bore cutting subsection.

7. The drilling tool of claim 1, wherein the bottom wall defines an outer surface for abutment against a building member during use of the tool to halt axial movement of the tool.

8. The drilling tool of claim 7, wherein the bottom wall comprises a plurality of nubs with spacing between one another.

9. The drilling tool of claim 8, wherein the nubs are circumferentially spaced about a peripherally outer area of the bottom wall.

10. The drilling tool of claim 1, wherein the engagement protrusion is selected from the group consisting of a continuous annular ring extending about the retainer bottom surface substantially coaxial to the central axis, a segmented annular ring extending about the retainer substantially coaxial to the central axis, and one or more projections extending toward the inner surface of the collar, or the engagement protrusion is selected from the group consisting of a continuous annular ring extending about the collar inner surface substantially coaxial to the central axis, a segmented annular ring extending about the collar inner surface substantially coaxial to the central axis, and one or more projections extending toward the retainer bottom surface.

11. The drilling tool of claim 1, wherein the working piece, collar and retainer are not all formed from the same material.

12. A drilling tool comprising:
    a working piece comprising a distal shank defining a central axis and a proximal cutting section;
    a collar having a bottom wall defining an inner surface and outer building member abutment surface;
    a retainer mounted relative to the working piece in a rotationally fixed relationship and defining a bottom surface facing the inner surface of the collar bottom wall, the retainer being received by the collar positioned in a rotationally independent relationship; and
    an engagement protrusion extending integrally from the retainer or extending integrally from the collar, wherein the engagement protrusion forms a contact interface between the retainer and collar, thereby maintaining the retainer and collar in a quasi-floating configuration whereby the working piece and retainer are rotatable relative to the collar with the outer surface of the bottom wall forming an axial stop against a building member.

13. The drilling tool of claim 12, wherein the engagement protrusion extends from the retainer bottom surface toward the collar inner surface or extends from the collar inner surface toward the retainer bottom surface.

14. The drilling tool of claim 12, wherein the engagement protrusion is selected from the group consisting of a continuous annular ring extending about the retainer bottom surface substantially coaxial to the central axis, a segmented annular ring extending about the retainer substantially coaxial to the central axis, and one or more projections extending toward the inner surface of the collar, or the engagement protrusion is selected from the group consisting of a continuous annular ring extending about the collar inner surface substantially coaxial to the central axis, a segmented annular ring extending about the collar inner surface substantially coaxial to the central axis, and one or more projections extending toward the retainer bottom surface.

15. The drilling tool of claim 14, wherein the engagement protrusion is a continuous annular ring with a substantially parabolic cross-section contour defining an apex that circumscribes the axis, wherein the apex engages the inner surface.

16. A drilling tool comprising:
    a working piece comprising a distal shank defining a central axis and a cutting section with a proximal tip;
    a retainer extending from the working piece intermediate the shank and the tip, the retainer and working piece being rotationally fixed, the retainer defining a bottom surface;
    a collar mounted to the retainer in an axially fixed relationship and having an inner surface facing the bottom surface of the retainer,
    an engagement protrusion comprising a continuous annular ring positioned axially between the bottom surface of the retainer and the inner surface of the collar and radially outward of the shank, wherein
    the working piece and retainer are rotatable relative to the collar with the protrusion maintaining axial spacing between the bottom surface of the retainer and the inner surface of the collar.

17. The drilling tool of claim 16, wherein the engagement protrusion is integral to the retainer or the collar.

18. The drilling tool of claim 16, wherein the continuous annular ring has a substantially parabolic cross-section contour defining an apex that circumscribes the axis, wherein the apex engages the inner surface.

19. The drilling tool of claim 16, wherein the engagement protrusion comprises one or more projections extending toward the inner surface of the collar.

20. The drilling tool of claim 16, wherein the cutting section comprises a distal bore cutting subsection and a counterbore cutting subsection proximal to the bore cutting section.

21. The drilling tool of claim 16, wherein the working piece is formed from a single sheet of metal.

22. The drilling tool of claim 21, wherein the shank is formed by bending the sheet to a substantially cylindrical or polygonal prismic shape and the cutting section includes machined surfaces to form cutting edges of each of the bore cutting subsection and the counterbore cutting subsection.

23. The drilling tool of claim 21, wherein the cutting section comprises a distal bore cutting subsection and a counterbore cutting subsection each of the bore cutting subsection and counterbore cutting subsection being defined by opposite cutting edges in the sheet.

24. The drilling tool of claim 23, wherein the edges that define the bore cutting subsection continuously transition to the edges that define the counterbore cutting subsection.

* * * * *